(12) United States Patent
Cheng et al.

(10) Patent No.: US 12,557,073 B2
(45) Date of Patent: Feb. 17, 2026

(54) SIGNALING IN ASYNCHRONOUS CARRIER AGGREGATION

(71) Applicant: Qualcomm Incorporated, San Diego, CA (US)

(72) Inventors: Peng Cheng, Beijing (CN); Masato Kitazoe, Hachiouji (JP); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/768,981

(22) PCT Filed: Oct. 29, 2020

(86) PCT No.: PCT/CN2020/124816
§ 371 (c)(1),
(2) Date: Apr. 14, 2022

(87) PCT Pub. No.: WO2021/088713
PCT Pub. Date: May 14, 2021

(65) Prior Publication Data
US 2023/0217417 A1    Jul. 6, 2023

(30) Foreign Application Priority Data

Nov. 7, 2019    (WO) ................ PCT/CN2019/116146

(51) Int. Cl.
*H04W 72/02* (2009.01)
*H04W 72/0446* (2023.01)
*H04W 72/11* (2023.01)

(52) U.S. Cl.
CPC ....... *H04W 72/02* (2013.01); *H04W 72/0446* (2013.01); *H04W 72/11* (2023.01)

(58) Field of Classification Search
CPC . H04W 72/02; H04W 72/0446; H04W 72/11; H04W 56/0015; H04L 5/001; H04L 5/0032
See application file for complete search history.

(56) References Cited

U.S. PATENT DOCUMENTS

| 9,949,183 B2 | 4/2018 | Axmon et al. |
| 10,609,663 B2 | 3/2020 | Vajapeyam et al. |

(Continued)

FOREIGN PATENT DOCUMENTS

| CN | 106537975 A | 3/2017 |
| CN | 110062411 A | 7/2019 |

(Continued)

OTHER PUBLICATIONS

3GPP TSG-RAN WG4 Meeting #71; R4-143028; Source: Intel Corporation, Title: Discussion on SFN timing difference in Dual connectivity, Seoul, Korea, May 19-23, 2014 (Year: 2014).*

(Continued)

*Primary Examiner* — Mohammed S Chowdhury
(74) *Attorney, Agent, or Firm* — Holland & Hart LLP/Qualcomm

(57) ABSTRACT

Methods, systems, and devices for wireless communications are described. A user equipment (UE) may identify a misalignment between system frame numbers (SFNs) associated with multiple serving cells in an asynchronous carrier aggregation configuration. The UE may select an SFN to use as an input for calculating a transmission parameter associated with communicating with one or more of the serving cells. Additionally, the serving cells may identify which SFN the UE selects in order to communicate efficiently with the UE. In some examples, the UE may receive an explicit indication of which SFN to use, and select the SFN accordingly. In other examples, the UE may select which SFN to use based on one or more parameters associated with the (Continued)

serving cells in the asynchronous carrier aggregation configuration.

22 Claims, 18 Drawing Sheets

(56) References Cited

U.S. PATENT DOCUMENTS

| | | | |
|---|---|---|---|
| 2016/0204927 A1 | 7/2016 | Yi et al. | |
| 2017/0257788 A1 | 9/2017 | Takahashi et al. | |
| 2018/0049229 A1* | 2/2018 | Dinan | H04W 72/21 |
| 2018/0192338 A1* | 7/2018 | Axmon | H04W 36/0083 |
| 2019/0098689 A1 | 3/2019 | Wei et al. | |
| 2019/0313272 A1 | 10/2019 | Zhou et al. | |
| 2021/0400763 A1* | 12/2021 | Zhou | H04W 52/0235 |
| 2022/0272650 A1* | 8/2022 | Ko | H04W 56/0045 |

FOREIGN PATENT DOCUMENTS

| | | |
|---|---|---|
| CN | 110213837 A | 9/2019 |
| WO | 2016007269 A1 | 1/2016 |
| WO | WO-2016042122 A1 | 3/2016 |

OTHER PUBLICATIONS

3GPP TSG-RAN WG2 Meeting #87; R2-143808; Source: Huawei (Rapporteur); Title: Report and summary of email discussion [86 #29][LTE/DC] RRM measurements; Dresden, Germany, Aug. 18-22, 2014 (Year: 2014).*
3GPP TSG-RAN WG2 Meeting #107bis; R2-1913454; Source: Nokia, Nokia Shanghai Bell; Title : CG and SPS occasions determination for new periodicities; Chongqing, China, Oct. 14-18, 2019 (Year: 2019).*
3GPP TSG-RAN WG2 Meeting #107bis; R2-1915693; Source: Nokia, Nokia Shanghai Bell; Title: Further discussion on CG periodicities and CG and SPS occasions determination for new periodicities; Chongqing, China, Oct. 14-18, 2019. (Year: 2019).*
3GPP TSG-RAN WG2 Meeting #107bis; R2-1916527; Source: Nokia, Nokia Shanghai Bell; Title: Summary of Offline 53, CG/SPS configuration and MAC CE for confirmation; Chongqing, China, Oct. 14-18, 2019 (Year: 2019).*
3GPP TSG RAN WG1 Meeting #98bis; R1-1910839; Source: LG Electronics; Title: Discussion on support of CA with unaligned frame boundary; Chongqing, China, Oct. 14-20, 2019. (Year: 2019).*
3GPP TSG-RAN WG1#98bis; R1-1911016; Source: Ericsson; Title: Inter-band CA with unaligned frame boundary; Chongqing, China, Oct. 14-18, 2019. (Year: 2019).*
Intel Corporation: "Discussion on SFN Timing Difference in Dual Connectivity", 3GPP Draft, 3GPP TSG-RAN WG4 Meeting #71, R4-143028, 3rd Generation Partnership Project (3GPP), Mobile Competence Centre, 650, Route Des Lucioles, F-06921, Sophia-Antipolis Cedex, France, vol. RAN WG4, No. Seoul, Korea; May 19, 2014-May 23, 2014, May 12, 2014 (May 12, 2014), 7 Pages, XP050823961, Retrieved from the Internet: URL: http://www.3gpp.org/ftp/tsg_ran/WG4_Radio/TSGR4_71/Docs/ [retrieved on May 12, 2014] the whole document.
Intel Corporation: "Discussion on UE Reporting of SFN/Subframe Offset for DC Enhancement," 3GPP TSG-RAN WG4 Meeting #75, R4-153580, May 25-29, 2015(May 29, 2015), pp. 1-6.
International Search Report and Written Opinion—PCT/CN2019/116146—ISA/EPO—Aug. 5, 2020 (200428WO1).
International Search Report and Written Opinion—PCT/CN2020/124816—ISA/EPO—Jan. 20, 2021 (200428WO2).
Nokia Networks, et al., "RRM Measurements for Dual Connectivity," 3GPP TSG-RAN WG2 Meeting #87, R2-143482, Aug. 18-22, 2014 (Aug. 22, 2014) the whole document, 3 pages.
NTT Docomo: "Dual Connectivity for LTE", 3GPP TSG RAN meeting #64, RP-140986, 3rd Generation Partnership Project, Mobile Competence Centre, 650, Route Des Lucioles, F-06921 Sophia-Antipolis, France, vol. TSG RAN, No. Sophia Antipolis, France, Jun. 10, 2014-Jun. 13, 2014, Jun. 14, 2014, 26 Pages, XP051646087, pp. 2-11.
Supplementary European Search Report—EP20884008—Search Authority—The Hague—Nov. 24, 2023 (200428EP).

* cited by examiner

SIGNALING IN ASYNCHRONOUS CARRIER AGGREGATION

CROSS-REFERENCE TO RELATED APPLICATIONS

The present Application is a 371 national stage filing of International PCT Application No. PCT/CN2020/124816 by Cheng et al., entitled "SIGNALING IN ASYNCHRONOUS CARRIER AGGREGATION," filed Oct. 29, 2020; and claims priority to International PCT Application No. PCT/CN2019/116146 by Cheng et al., entitled "SIGNALING IN ASYNCHRONOUS CARRIER AGGREGATION," filed Nov. 7, 2019, each of which is assigned to the assignee hereof, and each of which is expressly incorporated by reference in its entirety herein.

FIELD OF TECHNOLOGY

The following relates generally to wireless communications and more specifically to signaling in asynchronous carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may communicate with multiple serving cells of a wireless communications system in a carrier aggregation (CA) configuration. In some instances, communications with the multiple serving cells may be asynchronous, where frame boundaries of communications with the multiple serving cells may be misaligned. Such a misalignment may make it difficult for the UE to communicate concurrently with the multiple serving cells.

SUMMARY

The described techniques relate to improved methods, systems, devices, and apparatuses that support signaling in asynchronous carrier aggregation. Generally, the described techniques provide for enabling a user equipment (UE) to identify a misalignment between system frame numbers (SFNs) associated with multiple serving cells in an asynchronous carrier aggregation configuration. Because of the misalignment, there may be ambiguity regarding which of the SFNs the UE should use as an input in calculating various transmission parameters. Therefore, the described techniques provide potential methods for a UE selecting an SFN to use as an input for calculating a transmission parameter associated with communicating with one or more of the serving cells. Additionally or alternatively, the serving cells may identify which SFN the UE selects in order to communicate efficiently with the UE. In some examples, the UE may receive an explicit indication of which SFN to use, and select the SFN accordingly. In other examples, the UE may select which SFN to use based on one or more parameters associated with the serving cells in the asynchronous carrier aggregation configuration.

A method of wireless communications at a UE is described. The method may include identifying that the UE is configured to communicate with a first serving cell and with a second serving cell via asynchronous carrier aggregation, where a misalignment exists between a first system frame number associated with the first serving cell and a second system frame number associated with the second serving cell, selecting a system frame number for transmission parameter calculation input from the first system frame number and the second system frame number based on existence of the misalignment, calculating a transmission parameter based on the selected system frame number, and communicating with at least one of the first serving cell and the second serving cell based on the calculated transmission parameter.

An apparatus for wireless communications at a UE is described. The apparatus may include a processor, memory coupled with the processor, and instructions stored in the memory. The instructions may be executable by the processor to cause the apparatus to identify that the UE is configured to communicate with a first serving cell and with a second serving cell via asynchronous carrier aggregation, where a misalignment exists between a first system frame number associated with the first serving cell and a second system frame number associated with the second serving cell, select a system frame number for transmission parameter calculation input from the first system frame number and the second system frame number based on existence of the misalignment, calculate a transmission parameter based on the selected system frame number, and communicate with at least one of the first serving cell and the second serving cell based on the calculated transmission parameter.

Another apparatus for wireless communications at a UE is described. The apparatus may include means for identifying that the UE is configured to communicate with a first serving cell and with a second serving cell via asynchronous carrier aggregation, where a misalignment exists between a first system frame number associated with the first serving cell and a second system frame number associated with the second serving cell, selecting a system frame number for transmission parameter calculation input from the first system frame number and the second system frame number based on existence of the misalignment, calculating a transmission parameter based on the selected system frame number, and communicating with at least one of the first serving cell and the second serving cell based on the calculated transmission parameter.

A non-transitory computer-readable medium storing code for wireless communications at a UE is described. The code may include instructions executable by a processor to identify that the UE is configured to communicate with a first serving cell and with a second serving cell via asynchronous carrier aggregation, where a misalignment exists between a first system frame number associated with the first serving cell and a second system frame number associated with the second serving cell, select a system frame number for transmission parameter calculation input from the first system frame number and the second system frame number based on existence of the misalignment, calculate a transmission parameter based on the selected system frame number, and communicate with at least one of the first serving cell and the second serving cell based on the calculated transmission parameter.

In some examples of the method, apparatuses, and non-transitory computer-readable medium described herein, selecting the system frame number for transmission parameter calculation input may include operations, features, means, or instructions for identifying that one of the first serving cell and the second serving cell may be a configured serving cell configured for at least one of semi-persistent scheduling communications or configured grant communications, and selecting either the first system frame number or the second system frame number based on one of the first serving cell and the second serving cell being the configured serving cell.

In some examples of the method, apparatuses, and non-transitory computer-readable medium described herein, selecting the system frame number for transmission parameter calculation input may include operations, features, means, or instructions for identifying that one of the first serving cell and the second serving cell may be a current serving cell, and selecting either the first system frame number or the second system frame number based on one of the first serving cell and the second serving cell being the current serving cell.

In some examples of the method, apparatuses, and non-transitory computer-readable medium described herein, selecting the system frame number for transmission parameter calculation input may include operations, features, means, or instructions for identifying that one of the first serving cell and the second serving cell may be operating in Frequency Range 2 and may have a smallest serving cell index of the first serving cell and the second serving cell operating in Frequency Range 2, and selecting either the first system frame number or the second system frame number based on one of the first serving cell and the second serving cell having the smallest serving cell index of serving cells operating in Frequency Range 2.

In some examples of the method, apparatuses, and non-transitory computer-readable medium described herein, calculating the transmission parameter may include operations, features, means, or instructions for calculating a measurement gap for the serving cells operating in Frequency Range 2 based on the selected system frame number.

In some examples of the method, apparatuses, and non-transitory computer-readable medium described herein, calculating the transmission parameter may include operations, features, means, or instructions for calculating a measurement gap for serving cells in a master cell group (MCG) and in a secondary cell group (SCG) based on the selected system frame number.

In some examples of the method, apparatuses, and non-transitory computer-readable medium described herein, selecting the system frame number for transmission parameter calculation input may include operations, features, means, or instructions for identifying that one of the first serving cell and the second serving cell may be operating in Frequency Range 2 and may have a largest serving cell index of the first serving cell and the second serving cell operating in Frequency Range 2, and selecting either the first system frame number or the second system frame number based on one of the first serving cell and the second serving cell having the largest serving cell index of serving cells operating in Frequency Range 2.

In some examples of the method, apparatuses, and non-transitory computer-readable medium described herein, calculating the transmission parameter may include operations, features, means, or instructions for calculating a measurement gap for the serving cells operating in Frequency Range 2 based on the selected system frame number.

In some examples of the method, apparatuses, and non-transitory computer-readable medium described herein, calculating the transmission parameter may include operations, features, means, or instructions for calculating a measurement gap for serving cells in an MCG and in an SCG based on the selected system frame number.

In some examples of the method, apparatuses, and non-transitory computer-readable medium described herein, selecting the system frame number for transmission parameter calculation input may include operations, features, means, or instructions for identifying that the first serving cell and the second serving cell may be part of a same cell group, identifying a primary cell within the same cell group, and selecting either the first system frame number or the second system frame number based on one of the first serving cell and the second serving cell being the primary cell.

In some examples of the method, apparatuses, and non-transitory computer-readable medium described herein, the primary cell of the same cell group may be a primary cell (PCell) of an MCG.

In some examples of the method, apparatuses, and non-transitory computer-readable medium described herein, the primary cell of the same cell group may be a primary secondary cell (PSCell) of an SCG.

In some examples of the method, apparatuses, and non-transitory computer-readable medium described herein, selecting the system frame number for transmission parameter calculation input may include operations, features, means, or instructions for receiving an indication that one of the first serving cell or the second serving cell may be associated with the selected system frame number, and selecting either the first system frame number or the second system frame number based on the indication.

In some examples of the method, apparatuses, and non-transitory computer-readable medium described herein, the indication includes a cell index.

In some examples of the method, apparatuses, and non-transitory computer-readable medium described herein, receiving the indication may include operations, features, means, or instructions for receiving the indication via a radio resource control message.

In some examples of the method, apparatuses, and non-transitory computer-readable medium described herein, the transmission parameter includes a hybrid automatic repeat request (HARQ) process identification for semi-persistent scheduling or configured grant operation.

In some examples of the method, apparatuses, and non-transitory computer-readable medium described herein, the transmission parameter includes a slot associated with a downlink assignment occurrence in semi-persistent scheduling operation.

In some examples of the method, apparatuses, and non-transitory computer-readable medium described herein, the transmission parameter includes one or more symbols associated with an uplink grant occurrence in configured grant operation.

In some examples of the method, apparatuses, and non-transitory computer-readable medium described herein, the transmission parameter includes a starting point for an on-duration in a discontinuous reception cycle.

In some examples of the method, apparatuses, and non-transitory computer-readable medium described herein, the transmission parameter includes a measurement gap timing for serving cell operation in Frequency Range 2.

In some examples of the method, apparatuses, and non-transitory computer-readable medium described herein, the first serving cell may be associated with a first radio access technology (RAT) and the second serving cell may be associated with a second RAT.

In some examples of the method, apparatuses, and non-transitory computer-readable medium described herein, the first RAT may be different from the second RAT.

Some examples of the method, apparatuses, and non-transitory computer-readable medium described herein may further include operations, features, means, or instructions for identifying that the UE may be further configured to communicate with one or more additional serving cells, where a second misalignment exists between the first system frame number, the second system frame number, and additional system frame numbers associated with the one or more additional serving cells, updating the selected system frame number based on the second misalignment, where the updated system frame number includes the first system frame number, the second system frame number, or one of the additional system frame numbers, and calculating the transmission parameter based on the updated system frame number.

A method of wireless communications at a first serving cell is described. The method may include determining a misalignment between a first system frame number associated with the first serving cell and a second system frame number associated with a second serving cell, where the first serving cell and the second serving cell are in communication with a UE via asynchronous carrier aggregation, identifying a selected system frame number for transmission parameter calculation input from the first system frame number and the second system frame number based on existence of the misalignment, calculating a transmission parameter based on the selected system frame number, and communicating with the UE based on the calculated transmission parameter.

An apparatus for wireless communications at a first serving cell is described. The apparatus may include a processor, memory coupled with the processor, and instructions stored in the memory. The instructions may be executable by the processor to cause the apparatus to determine a misalignment between a first system frame number associated with the first serving cell and a second system frame number associated with a second serving cell, where the first serving cell and the second serving cell are in communication with a UE via asynchronous carrier aggregation, identify a selected system frame number for transmission parameter calculation input from the first system frame number and the second system frame number based on existence of the misalignment, calculate a transmission parameter based on the selected system frame number, and communicate with the UE based on the calculated transmission parameter.

Another apparatus for wireless communications at a first serving cell is described. The apparatus may include means for determining a misalignment between a first system frame number associated with the first serving cell and a second system frame number associated with a second serving cell, where the first serving cell and the second serving cell are in communication with a UE via asynchronous carrier aggregation, identifying a selected system frame number for transmission parameter calculation input from the first system frame number and the second system frame number based on existence of the misalignment, calculating a transmission parameter based on the selected system frame number, and communicating with the UE based on the calculated transmission parameter.

A non-transitory computer-readable medium storing code for wireless communications at a first serving cell is described. The code may include instructions executable by a processor to determine a misalignment between a first system frame number associated with the first serving cell and a second system frame number associated with a second serving cell, where the first serving cell and the second serving cell are in communication with a UE via asynchronous carrier aggregation, identify a selected system frame number for transmission parameter calculation input from the first system frame number and the second system frame number based on existence of the misalignment, calculate a transmission parameter based on the selected system frame number, and communicate with the UE based on the calculated transmission parameter.

In some examples of the method, apparatuses, and non-transitory computer-readable medium described herein, identifying the selected system frame number for transmission parameter calculation input may include operations, features, means, or instructions for identifying that one of the first serving cell and the second serving cell may be a configured serving cell configured for at least one of semi-persistent scheduling communications or configured grant communications, and identifying either the first system frame number or the second system frame number as the selected system frame number based on one of the first serving cell and the second serving cell being the configured serving cell.

In some examples of the method, apparatuses, and non-transitory computer-readable medium described herein, identifying the selected system frame number for transmission parameter calculation input may include operations, features, means, or instructions for identifying that one of the first serving cell and the second serving cell may be a current serving cell, and identifying either the first system frame number or the second system frame number as the selected system frame number based on one of the first serving cell and the second serving cell being the current serving cell.

In some examples of the method, apparatuses, and non-transitory computer-readable medium described herein, identifying the selected system frame number for transmission parameter calculation input may include operations, features, means, or instructions for identifying that one of the first serving cell and the second serving cell may be operating in Frequency Range 2 and may have a smallest serving cell index of serving cells operating in Frequency Range 2, and identifying either the first system frame number or the second system frame number as the selected system frame number based on one of the first serving cell and the second serving cell having the smallest serving cell index of serving cells operating in Frequency Range 2.

In some examples of the method, apparatuses, and non-transitory computer-readable medium described herein, calculating the transmission parameter may include operations, features, means, or instructions for calculating a measurement gap for the serving cells operating in Frequency Range 2 based on the selected system frame number.

In some examples of the method, apparatuses, and non-transitory computer-readable medium described herein, calculating the transmission parameter may include operations, features, means, or instructions for calculating a measurement gap for serving cells in an MCG and in an SCG based on the selected system frame number.

In some examples of the method, apparatuses, and non-transitory computer-readable medium described herein, identifying the selected system frame number for transmission parameter calculation input may include operations, features, means, or instructions for identifying that one of the first serving cell and the second serving cell may be operating in Frequency Range 2 and may have a largest serving cell index of serving cells operating in Frequency Range 2, and identifying either the first system frame number or the second system frame number as the selected system frame number based on one of the first serving cell and the second serving cell having the largest serving cell index of serving cells operating in Frequency Range 2.

In some examples of the method, apparatuses, and non-transitory computer-readable medium described herein, calculating the transmission parameter may include operations, features, means, or instructions for calculating a measurement gap for the serving cells operating in Frequency Range 2 based on the selected system frame number.

In some examples of the method, apparatuses, and non-transitory computer-readable medium described herein, calculating the transmission parameter may include operations, features, means, or instructions for calculating a measurement gap for serving cells in an MCG and in an SCG based on the selected system frame number.

In some examples of the method, apparatuses, and non-transitory computer-readable medium described herein, identifying the selected system frame number for transmission parameter calculation input may include operations, features, means, or instructions for identifying that the first serving cell and the second serving cell may be part of a same cell group, identifying a primary cell within the same cell group, and identifying either the first system frame number or the second system frame number as the selected system frame number based on one of the first serving cell and the second serving cell being the primary cell.

In some examples of the method, apparatuses, and non-transitory computer-readable medium described herein, the primary cell of the same cell group may be a PCell of an MCG.

In some examples of the method, apparatuses, and non-transitory computer-readable medium described herein, the primary cell of the same cell group may be a PSCell of an SCG.

In some examples of the method, apparatuses, and non-transitory computer-readable medium described herein, identifying the selected system frame number for transmission parameter calculation input may include operations, features, means, or instructions for transmitting an indication that one of the first serving cell or the second serving cell may be associated with the selected system frame number, and identifying either the first system frame number or the second system frame number as the selected system frame number based on the transmitted indication.

In some examples of the method, apparatuses, and non-transitory computer-readable medium described herein, the indication includes a cell index.

In some examples of the method, apparatuses, and non-transitory computer-readable medium described herein, transmitting the indication may include operations, features, means, or instructions for transmitting the indication via a radio resource control message.

In some examples of the method, apparatuses, and non-transitory computer-readable medium described herein, the transmission parameter includes a HARQ process identification for semi-persistent scheduling or configured grant operation.

In some examples of the method, apparatuses, and non-transitory computer-readable medium described herein, the transmission parameter includes a slot associated with a downlink assignment occurrence in semi-persistent scheduling operation.

In some examples of the method, apparatuses, and non-transitory computer-readable medium described herein, the transmission parameter includes one or more symbols associated with an uplink grant occurrence in configured grant operation.

In some examples of the method, apparatuses, and non-transitory computer-readable medium described herein, the transmission parameter includes a starting point for an on-duration in a discontinuous reception cycle.

In some examples of the method, apparatuses, and non-transitory computer-readable medium described herein, the transmission parameter includes a measurement gap timing for serving cell operation in Frequency Range 2.

In some examples of the method, apparatuses, and non-transitory computer-readable medium described herein, the first serving cell may be associated with a first RAT and the second serving cell may be associated with a second RAT.

In some examples of the method, apparatuses, and non-transitory computer-readable medium described herein, the first RAT may be different from the second RAT.

Some examples of the method, apparatuses, and non-transitory computer-readable medium described herein may further include operations, features, means, or instructions for identifying that the UE may be further configured to communicate with one or more additional serving cells, where a second misalignment exists between the first system frame number, the second system frame number, and additional system frame numbers associated with the one or more additional serving cells, updating the selected system frame number based on the second misalignment, where the updated system frame number includes the first system frame number, the second system frame number, or one of the additional system frame numbers, and calculating the transmission parameter based on the updated system frame number.

DETAILED DESCRIPTION

Figure 1:
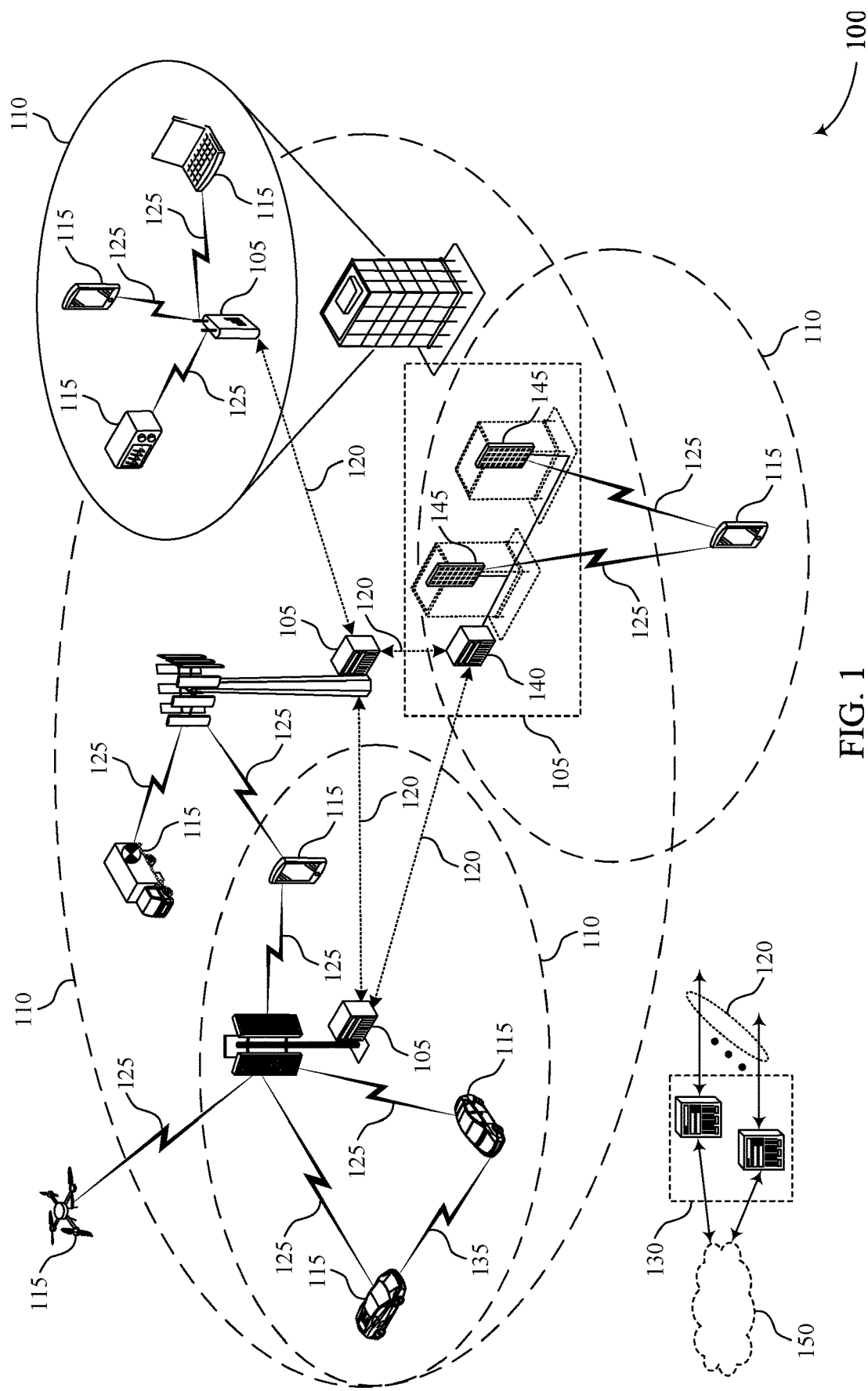
FIGS. 1 and 2 illustrate examples of a wireless communications system that supports signaling in asynchronous carrier aggregation in accordance with aspects of the present disclosure.

A user equipment (UE) in a wireless communications system may communicate with multiple serving cells (e.g., associated with one or more base stations) in a carrier aggregation (CA) configuration to increase available bandwidth and data rates for the UE. Each serving cell may communicate with the UE on a respective component carrier (CC) in a respective frequency band. Each serving cell may be associated with a radio access technology (RAT) (e.g., a fourth generation (4G) system such as a Long Term Evolution (LTE) system, a fifth generation (5G) system which may be referred to as a New Radio (NR) system, etc.). For example, a UE may communicate with two serving cells in a dual connectivity scheme, where each serving cell may belong to a different RAT or a different cell group within a RAT.

In some examples, each serving cell in communication with the UE may have a different starting point for communications on a respective CC. As a result, frame boundaries of communications may be misaligned in time (i.e., asynchronous). For example, a first serving cell may be associated with a first system frame number (SFN), while a second serving cell may be associated with a second SFN different from the first SFN. A number of transmission parameters at a UE may be calculated using an SFN as an input, and so it may be difficult to communicate concurrently in a CA configuration with serving cells associated with different SFNs. Additionally, with different aligned SFNs, there may be ambiguity regarding which SFN the UE should use in determining the various transmission parameters.

According to the techniques described herein, a UE may identify a misalignment between SFNs associated with multiple serving cells, and then select an SFN to use as an input for calculating a transmission parameter. Additionally, the serving cells may identify which SFN the UE selects in order to communicate efficiently with the UE. In some examples, the transmission parameter may include a hybrid automatic repeat request (HARQ) process identification (ID), a slot for a downlink assignment occurrence, a symbol for an uplink grant occurrence, a starting point for an on-duration of a discontinuous reception (DRX) cycle, a measurement gap timing for communications in a frequency range (e.g., Frequency Range 2 (FR2)), or a combination thereof.

The UE may select the SFN to use as input for calculations based on one or more factors. In some examples, the UE may receive an explicit indication from a network identifying the SFN the UE is to use. The UE may receive the indication as a serving cell index associated with a serving cell, for example in a Radio Resource Control (RRC) message. In some examples, the UE may communicate with a serving cell based on semi-persistent scheduling, a configured grant, or a combination thereof. The UE may select the SFN associated with a serving cell configured for semi-persistent scheduling or configured grant operations. In some examples, the UE may identify a current serving cell in the CA configuration, where the current serving cell may be a serving cell with which the UE recently communicated. The UE may select the SFN associated with the current serving cell. In some examples, the UE may identify that the serving cells in the CA configuration are included in a common cell group. The UE may select the SFN associated with a primary cell of the common cell group, where the primary cell may be a primary cell (PCell) of a master cell group (MCG) or a primary secondary cell (PSCell) of a secondary cell group (SCG).

In some examples, the UE may identify that one or more serving cells in the CA configuration are operating in FR2, which may correspond to a millimeter wave (mmW) frequency range. In one example, the UE may select the SFN associated with a serving cell having a largest serving cell index of the serving cells operating in FR2. In another example, the UE may select the SFN associated with a serving cell having a smallest serving cell index of the serving cells operating in FR2.

Aspects of the disclosure are initially described in the context of wireless communications systems. An example timing diagram and an example process flow illustrating aspects of the discussed techniques are then described. Aspects of the disclosure are further illustrated by and described with reference to apparatus diagrams, system diagrams, and flowcharts that relate to signaling in asynchronous carrier aggregation.

FIG. 1 illustrates an example of a wireless communications system 100 that supports signaling in asynchronous carrier aggregation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with one or more serving cells (e.g., one or more base stations 105) in an asynchronous CA configuration. The UE 115 may identify a misalignment between SFNs associated with the serving cells. The UE 115 may select an SFN to use as an input for calculating a transmission parameter associated with communicating with one or more of the serving cells. In some examples, the transmission parameter may include a HARQ process ID, a slot for a downlink assignment occurrence, a symbol for an uplink grant occurrence, a starting point for an on-duration of a DRX cycle, a measurement gap timing for communications in a frequency range (e.g., FR2), or a combination thereof. Additionally, the serving cells may identify which SFN the UE 115 selects in order to communicate efficiently with the UE.

The UE 115 may select which SFN to use as an input based on one or more factors. In some examples, a base station 105 may explicitly indicate which SFN the UE 115 is to use in an RRC message, for example by including an associated serving cell index in one or both of a CellGroupConfig or a mac-CellGroupConfig field in the RRC message. In some examples, the UE 115 may select the SFN associated with a base station 105 configured for semi-persistent scheduling or configured grant operations. In some examples, the UE 115 may select the SFN associated with a current base station 105. In some examples, the UE 115 may identify that the base stations 105 are in a cell group. The UE 115 may select the SFN associated with a primary cell of the cell group, where the primary cell may be a PCell of an MCG or a PSCell of an SCG. In some examples, the UE 115 may identify that the base stations 105 are operating in FR2. The UE 115 may select the SFN associated with a base station 105 having a largest serving cell index or a smallest serving cell index of the base stations 105. The SFN selection techniques performed by the UE 115 may support improvements to the UE 115 communication operations and, in some examples, may promote improvements to the UE 115 reliability, among other benefits.

Figure 2:
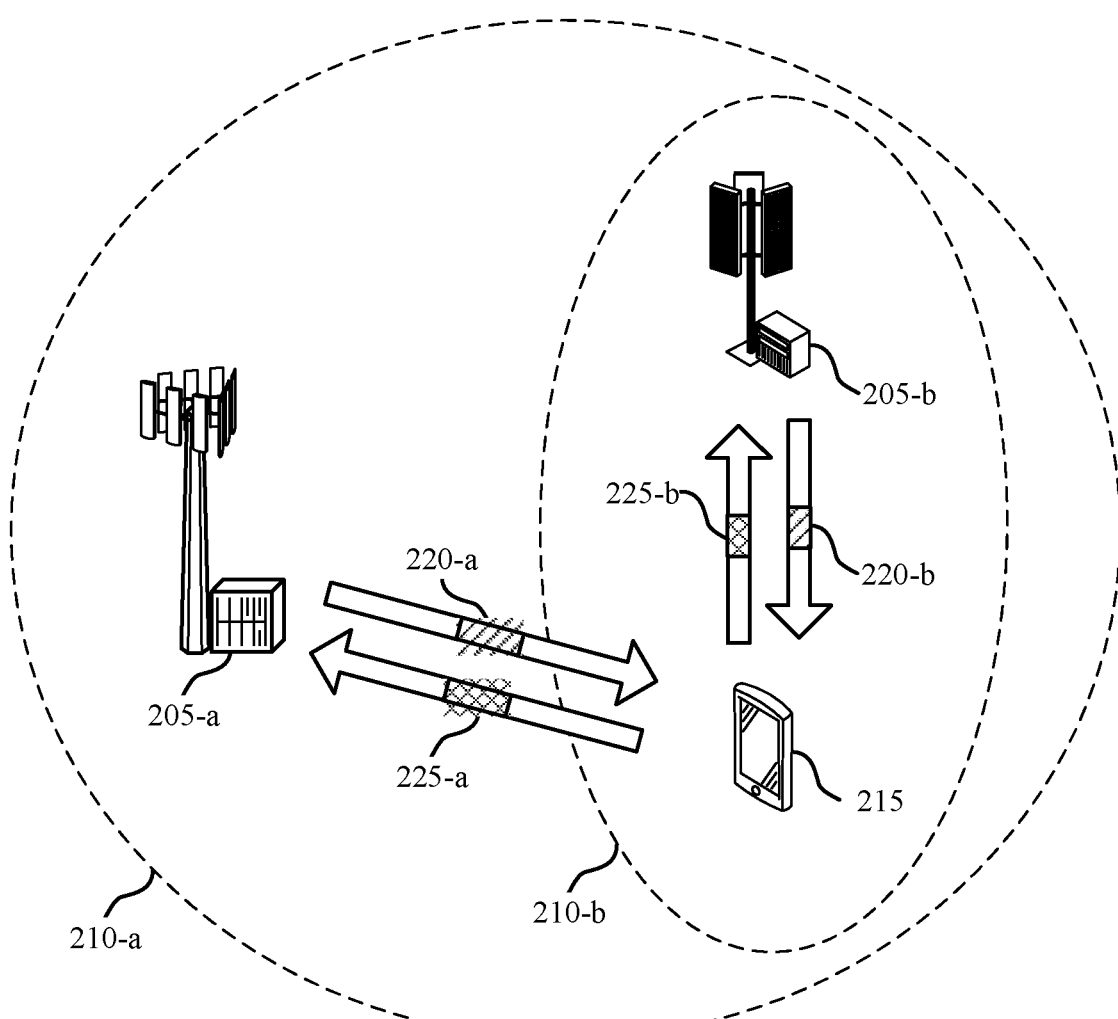

FIG. 2 illustrates an example of a wireless communications system 200 that supports signaling in asynchronous carrier aggregation in accordance with aspects of the present disclosure. In some examples, the wireless communications system 200 may implement aspects of wireless communication system 100. For example, the wireless communications system 200 may include base stations 205 and a UE 215, which may be examples of the corresponding devices described with reference to FIG. 1. The wireless communications system 200 may include features for improved signaling in asynchronous CA configurations, among other benefits.

In the wireless communications system 200, the base stations 205 may act as serving cells for geographic coverage areas 210. The base stations 205 may configure and transmit downlink transmissions 220 to the UE 215, and receive uplink transmissions 225 from the UE 215. As illustrated in FIG. 2, the UE 215 may communicate concurrently with the base station 205-a and the base station 205-b, for example in a CA configuration. In some examples, each base station 205 in communication with the UE 215 may have a different starting point for communications on a respective CC. As a result, the CA configuration may be asynchronous. For example, the base station 205-a may be associated with an SFN, while the base station 205-a may be associated with a second SFN different from the first SFN. A number of transmission parameters at the UE 215 may be calculated using an SFN as an input, and so the misaligned SFNs may make it difficult for the UE 215 to communicate concurrently with the base station 205-a and the base station 205-b in the CA configuration.

The UE 215 may select an SFN to use as an input for calculating one or more transmission parameters. In some examples, the UE 215 may receive an indication from the base station 205-a or the base station 205-b identifying which SFN the UE 215 is to use. For example, a base station 205 may transmit the indication in an RRC message. In some examples, the UE 215 may select the SFN associated with a base station 205 configured for semi-persistent scheduling or configured grant operations. In some examples, the UE 215 may select the SFN associated with a current base station 205. In some examples, the UE 215 may identify that the base stations 205 are in a cell group. The UE 215 may select the SFN associated with a primary cell of the cell group, where the primary cell may be a PCell of an MCG or a PSCell of an SCG. In some examples, the UE 215 may identify that the base stations 205 are operating in FR2. The UE 215 may select the SFN associated with a base station 205 having a largest serving cell index or a smallest serving cell index of the base stations 205 operating in FR2.

Figure 3:
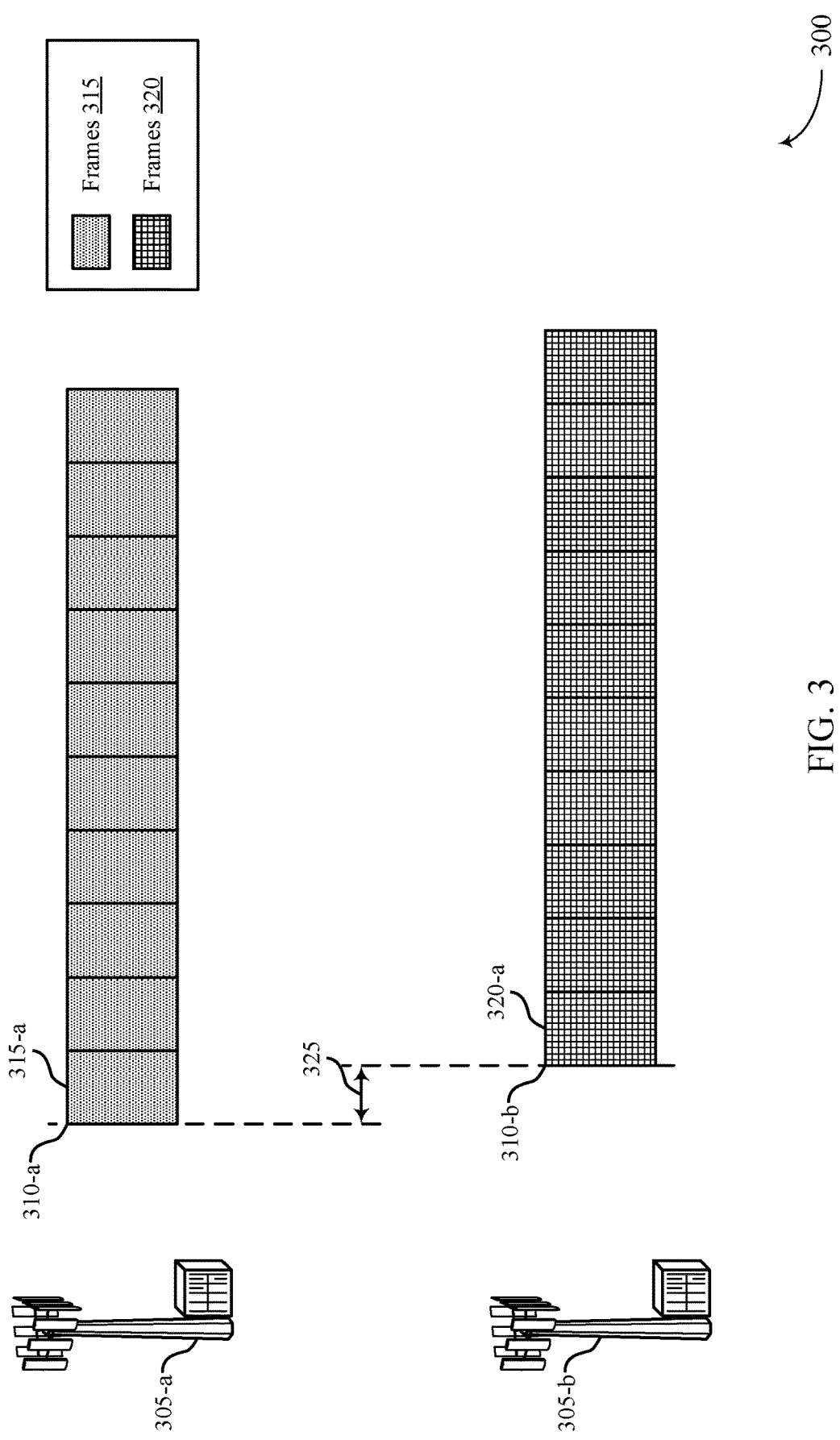
FIG. 3 illustrates an example of a timing diagram that supports signaling in asynchronous carrier aggregation in accordance with aspects of the present disclosure.

FIG. 3 illustrates an example of a timing diagram 300 that supports signaling in asynchronous carrier aggregation in accordance with aspects of the present disclosure. In some examples, the timing diagram 300 may implement aspects of wireless communication systems 100 and 200. The timing diagram 300 may be associated with communications between base stations 305 and a UE, which may be examples of corresponding devices described with reference to FIGS. 1 and 2.

The base station 305-a and the base station 305-b may communicate concurrently with a UE, for example in a CA configuration. The base station 305-a may exchange transmissions with the UE in frames 315, and the base station 305-b may exchange transmissions with the UE in frames 320. In some examples, the UE may communicate with one or more base stations 305 based on semi-persistent scheduling, a configured grant, or a combination thereof. Each base station 305 may have an associated starting point 310 for communications with the UE. For example, a starting point 310-a for the base station 305-a may be associated with the beginning of a first frame 315-a for communicating with the UE, and a starting point 310-b for the base station 305-b may be associated with the beginning of a first frame 320-a for communicating with the UE. The frame 315-a may be associated with a first SFN, while the frame 320-a may be associated with a second SFN.

As illustrated in FIG. 3, the starting point 310-a and the starting point 310-b may be misaligned in time, separated by a misalignment 325. In some examples, the misalignment 325 may be below a threshold, which may be correspond to a quantity of sampling periods $T_S$ (e.g., 76800 $T_S$). As a result of the misalignment 325, the first SFN may be different from the second SFN. The misalignment 325 may be a duration such that slots within the frames 315 may be aligned with slots within the frames 320. That is, while boundaries of the frames 315 may be misaligned with boundaries of the frames 320, boundaries of the slots within the frames 315 and the frames 320 may maintain alignment.

Based on the misalignment 325, the UE may select an SFN (e.g., the first SFN or the second SFN) to use as an input for calculating one or more transmission parameters. In some examples, the transmission parameter may include a HARQ process ID, a slot for a downlink assignment occurrence, a symbol for an uplink grant occurrence, a starting point for an on-duration of a DRX cycle, a measurement gap timing for communications in a frequency range (e.g., FR2), or a combination thereof.

The UE may select which SFN to use as an input based on one or more factors. In some examples, a base station 305 may explicitly indicate which SFN the UE is to use in an RRC message, for example by including an associated serving cell index in one or both of a CellGroupConfig or a mac-CellGroupConfig field in the RRC message. In some examples, the UE may select the SFN associated with a base station 305 configured for semi-persistent scheduling or configured grant operations. In some examples, the UE may select the SFN associated with a current base station 305. In some examples, the UE may identify that the base stations 305 are in a cell group. The UE may select the SFN associated with a primary cell of the cell group, where the primary cell may be a PCell of an MCG or a PSCell of an SCG. In some examples, the UE may identify that the base stations 305 are operating in FR2. The UE may select the SFN associated with a base station 305 having a largest serving cell index or a smallest serving cell index of the base stations 305.

In some examples, in addition to using the selected SFN as an input, the UE may calculate the transmission parameters based on a configured number of consecutive slots (e.g., 10, 20, etc.) in a frame (e.g., within a frame 315 or a frame 320), which may be represented by an input parameter numberOfSlotsPerFrame. Additionally or alternatively, the UE may calculate the transmission parameters based on a configured number of symbols within a slot, which may be represented by an input parameter numberOfSymbolsPerSlot.

In semi-persistent scheduling or configured grant operations, the UE may calculate the HARQ process ID based on the formula [floor(CURRENT_slot×10/(numberOfSlotsPerFrame×periodicity))], where CURRENT_slot=[(SFN×numberOfSlotsPerFrame)+slot number in the frame]. The UE may use the selected SFN (e.g., the first SFN or the second SFN) as an input to calculate the CURRENT_slot parameter.

In semi-persistent scheduling operations, a given downlink assignment (which may be referred to as an Nth downlink assignment) may occur in a slot which satisfies the equality (numberOfSlotsPerFrame×SFN+slot number in the frame)=[(numberOfSlotsPerFrame×SFN$_{start\ time}$+slot$_{start\ time}$)+N×periodicity×numberOfSlotsPerFrame/10] mod (1024×numberOfSlotsPerFrame), where SFN$_{start\ time}$ and slot$_{start\ time}$, respectively, represent the SFN and the slot corresponding to a first transmission of a physical downlink shared channel (PDSCH) where the downlink assignment was initialized (or reinitialized). The UE may use the selected SFN (e.g., the first SFN or the second SFN) as an input to calculate the parameter numberOfSlotsPerFrame×SFN+slot number in the frame.

For a first type of configured grant operations (which may be referred to as configured grant Type 1), a MAC entity may consider that an uplink grant recurs in each symbol which satisfies the equality [(SFN×numberOfSlotsPerFrame×numberOfSymbolsPerSlot)+(slot number in the frame×numberOfSymbolsPerSlot)+symbol number in the slot]=(timeDomainOffset×numberOfSymbolsPerSlot+S+N×periodicity) mod (1024×numberOfSlotsPerFrame×numberOfSymbolsPerSlot), where N≥0. For a second type of configured grant operations (which may be referred to as configured grant Type 2), a MAC entity may consider that an uplink grant recurs in each symbol which satisfies the equality [(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+slot$_{start\ time}$×numberOfSymbolsPerSlot+symbol$_{start\ time}$)+N×periodicity] mod (1024×numberOfSlotsPerFrame×numberOfSymbolsPerSlot), where SFN$_{start\ time}$, slot$_{start\ time}$, and symbol$_{start\ time}$, respectively, represent the SFN, the slot, and the symbol corresponding to a first transmission opportunity of a physical uplink shared channel (PUSCH) where the uplink grant was initialized (or reinitialized). In both configured grant types, the UE may use the selected SFN (e.g., the first SFN or the second SFN) as an input to calculate the parameter SFN×numberOfSlotsPerFrame×numberOfSymbolsPerSlot.

For a short DRX cycle, the UE may calculate the starting point drx-StartOffset of the DRX on-duration according to the formula [(SFN×10)+subframe number] mod (drx-ShortCycle)=(drx-StartOffset) mod (drx-ShortCycle). For a long DRX cycle, the UE may calculate the starting point drx-StartOffset of the DRX on-duration according to the formula [(SFN×10)+subframe number] mod (drx-LongCycle)=drx-StartOffset. For both DRX cycle lengths, the UE may use the selected SFN (e.g., the first SFN or the second SFN) as an input to calculate the parameter [(SFN×10)+subframe number].

For communications in FR2, the UE may calculate that a first subframe of a gap occurs at an SFN that satisfies the equality SFN mod T=floor(gapOffset/10) and at a subframe that satisfies the equality subframe=gapOffset mod 10, where T=MGRP/10 and MGRP represents a measurement gap repetition period. In a standalone NR connectivity scheme, or in a dual connectivity scheme (e.g., next-generation radio access network (NG-RAN) evolved universal terrestrial radio access (E-UTRA)-NR dual connectivity ((NG)EN-DC), NR-E-UTRA dual connectivity (NE-DC), E-UTRA-NR dual connectivity (EN-DC), NR dual connectivity (NR-DC), etc.), the first subframe of a gap may occur at an SFN and subframe associated with a base station 305 operating in FR2. The UE may select which SFN to use according to the selection techniques described herein. In some examples, such as in an NE-DC or NR-DC scheme, a base station 305 may indicate which SFN to use in a refServCellIndicator field of an RRC message. The refServCellIndicator field may include a value pCell, pSCell, or mcg-FR2, where these values correspond respectively to a PCell of an MCG, a PSCell of an SCG, and a base station 305 in the MCG operating in FR2. If the UE is operating in a standalone NR connectivity scheme, an (NG)EN-DC scheme, or if the value mcg-FR2 is indicated in the refServCellIndicator field, the UE may select which SFN to use for the gap calculation according to the selection techniques described herein. In some examples, if the value mcg-FR2 is indicated in the refServCellIndicator field, the base station 305 may indicate which serving cell the UE is to use as an FR2 gap timing reference, such as in a refFR2ServCellAsyncCA field of the RRC message. In some examples, the calculated measurement gap may apply to all the base stations 305 operating in FR2. In some examples, the calculated measurement gap may apply to all base stations 305 in both an MCG and an SCG.

Figure 4:
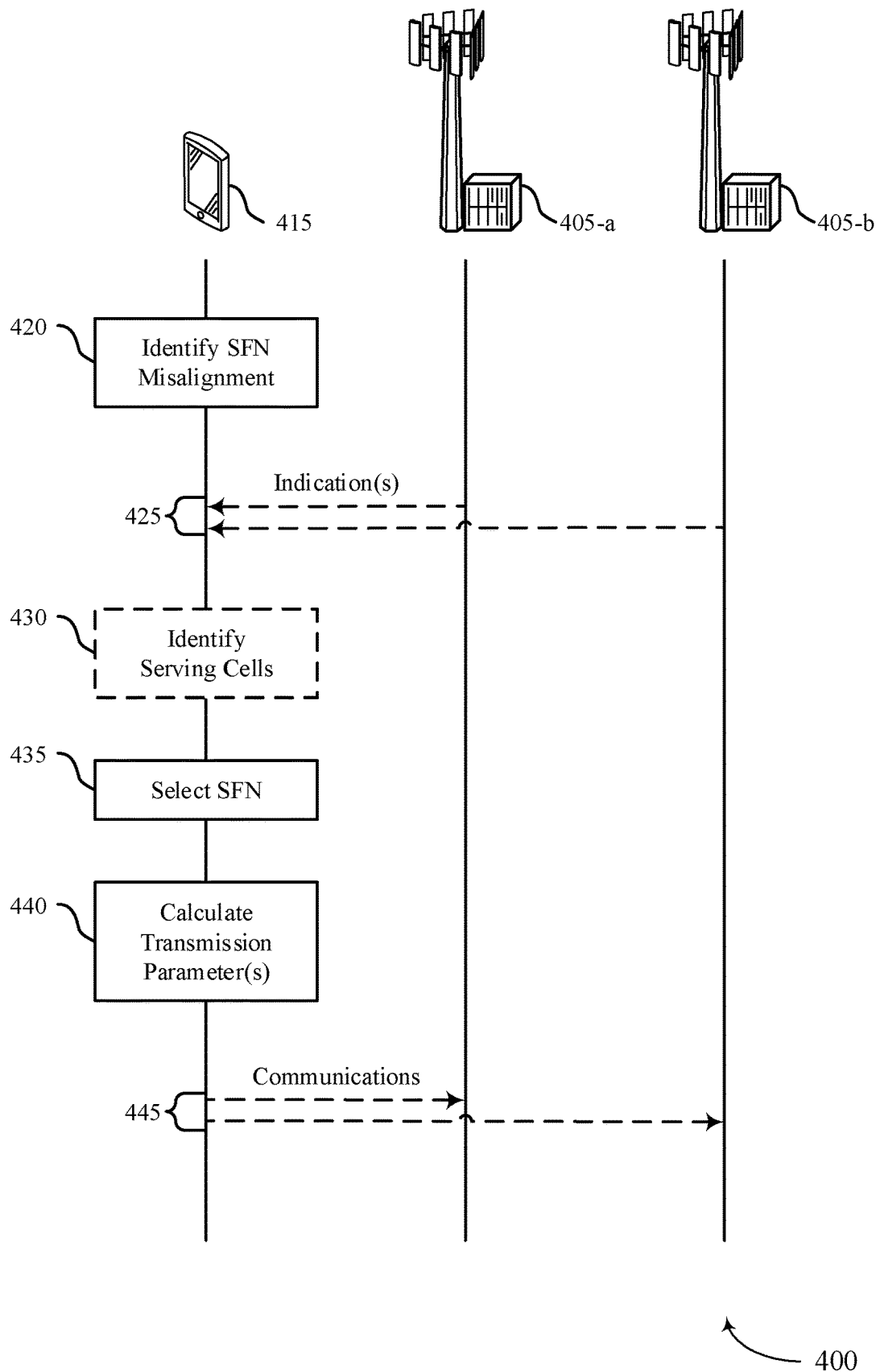
FIG. 4 illustrates an example of a process flow that supports signaling in asynchronous carrier aggregation in accordance with aspects of the present disclosure.

FIG. 4 illustrates an example of a process flow 400 that supports signaling in asynchronous carrier aggregation in accordance with aspects of the present disclosure. In some examples, process flow 400 may implement aspects of wireless communication systems 100 and 200. For example, the process flow 400 may include base stations 405 and a UE 415, which may be examples of the corresponding devices described with reference to FIGS. 1 and 2. In the following description of the process flow 400, the operations between the base stations 405 and the UE 415 may be transmitted in a different order than the example order shown, or the operations performed by the base stations 405 and the UE 415 may be performed in different orders or at different times. Some operations may also be omitted from the process flow 400, and other operations may be added to the process flow 400. The operations performed by the base stations 405 and the UE 415 may support improvement to the UE 415 transmission operations and, in some examples, may promote improvements to the UE 415 reliability, among other benefits.

At 420, the UE 415 may identify a misalignment between a first SFN associated with the base station 405-a and a second SFN associated with the base station 405-b. The UE 415 may communicate concurrently with the base stations 405 in an asynchronous CA configuration. A number of transmission parameters at the UE 415 may be calculated using an SFN as an input, and so the misaligned SFNs may make it difficult for the UE 415 to communicate concurrently with the base station 405-a and the base station 405-b in the CA configuration. The base station 405-a and the base station 405-b may also identify the SFN misalignment at 420.

In some examples, the UE 415 may identify additional base stations 405 (not shown) configured to communicate with the UE 415 in the asynchronous CA configuration. The UE 415 may identify an additional misalignment between the first SFN, the second SFN, and additional SFNs associated with the additional base stations 405.

In some examples, at 425 the base station 405-a or the base station 405-b may transmit an explicit indication of which SFN the UE 415 is to use for calculating transmission parameters. In some examples, a base station 405 may explicitly indicate which SFN the UE 415 is to use in an RRC message, for example by including an associated serving cell index in one or both of a CellGroupConfig or a mac-CellGroupConfig field in the RRC message.

In some examples, at 430, the UE 415 may identify one or more serving cell parameters associated with the base station 405-a and the base station 405-b. The identified serving cell parameters may influence which SFN the UE 415 selects for calculating the transmission parameters. In some examples, the UE 415 may identify a first serving cell index associated with the base station 405-a and a second serving cell index associated with the base station 405-b. In some examples, the UE 415 may identify a configuration for communicating with the base station 405-a or the base station 405-b based on semi-persistent scheduling, a configured grant, or a combination thereof. In some examples, the UE 415 may identify the base station 405-a or the base station 405-b as a current serving cell in the CA configuration, where the current serving cell may be a serving cell with which the UE 415 recently communicated. In some examples, the UE 415 may identify that the base station 405-a and the base station 405-b are included in a common cell group. The UE 415 may additionally identify that the base station 405-a or the base station 405-b is a primary cell within the common cell group (e.g., a PCell in an MCG or a PSCell in and SCG). In some examples, the UE 415 may identify that one or both of the base station 405-a or the base station 405-b is operating in FR2.

At 435, the UE 415 may select an SFN to use for calculating the transmission parameters. The base station 405-a and the base station 405-b may additionally identify which SFN the UE 415 has selected in order to communicate efficiently with the UE 415. In some examples, the UE 415 may select the SFN based on the indication received from the base station 405-*a* or the base station 405-*b*. In some examples, the UE 415 may select the SFN associated with the base station 405 configured for semi-persistent scheduling or configured grant operations. In some examples, the UE 415 may select the SFN associated with the current serving cell. In some examples, the UE 415 may select the SFN associated with the primary cell of the common cell group. In some examples, the UE 415 may select the SFN associated with a base station 405 having a largest serving cell index or a smallest serving cell index of the base stations 405 operating in FR2.

In some examples, the UE 415 may update the selected SFN based on the additional misalignment between the first SFN, the second SFN, and the additional SFNs. The updated SFN may include the first SFN, the second SFN, or one of the additional SFNs.

At 440, the UE 415 may calculate one or more transmission parameters using the selected SFN as an input. The base station 405-*a* and the base station 405-*b* may additionally calculate the one or more transmission parameters in order to communicate efficiently with the UE 415. In some examples, the one or more may include a HARQ process ID, a slot for a downlink assignment occurrence, a symbol for an uplink grant occurrence, a starting point for an on-duration of a DRX cycle, a measurement gap timing for communications in a frequency range (e.g., FR2), or a combination thereof. In some examples, the UE 415 may use the selected SFN to calculate a measurement gap which applies to all the base stations 405 operating in FR2. In some examples, the calculated measurement gap may apply to all base stations 405 in both an MCG and an SCG. In some examples, the UE 415 may calculate the one or more transmission parameters based on the updated SFN.

At 445, the UE 415 may communicate with at least one of the base station 405-*a* and the base station 405-*b* based on the calculated transmission parameters. The operations performed by the base stations 405 and the UE 415 may support improvements to the UE 415 communication operations and, in some examples, may promote improvements to the UE 415 reliability, among other benefits.

Figure 5:
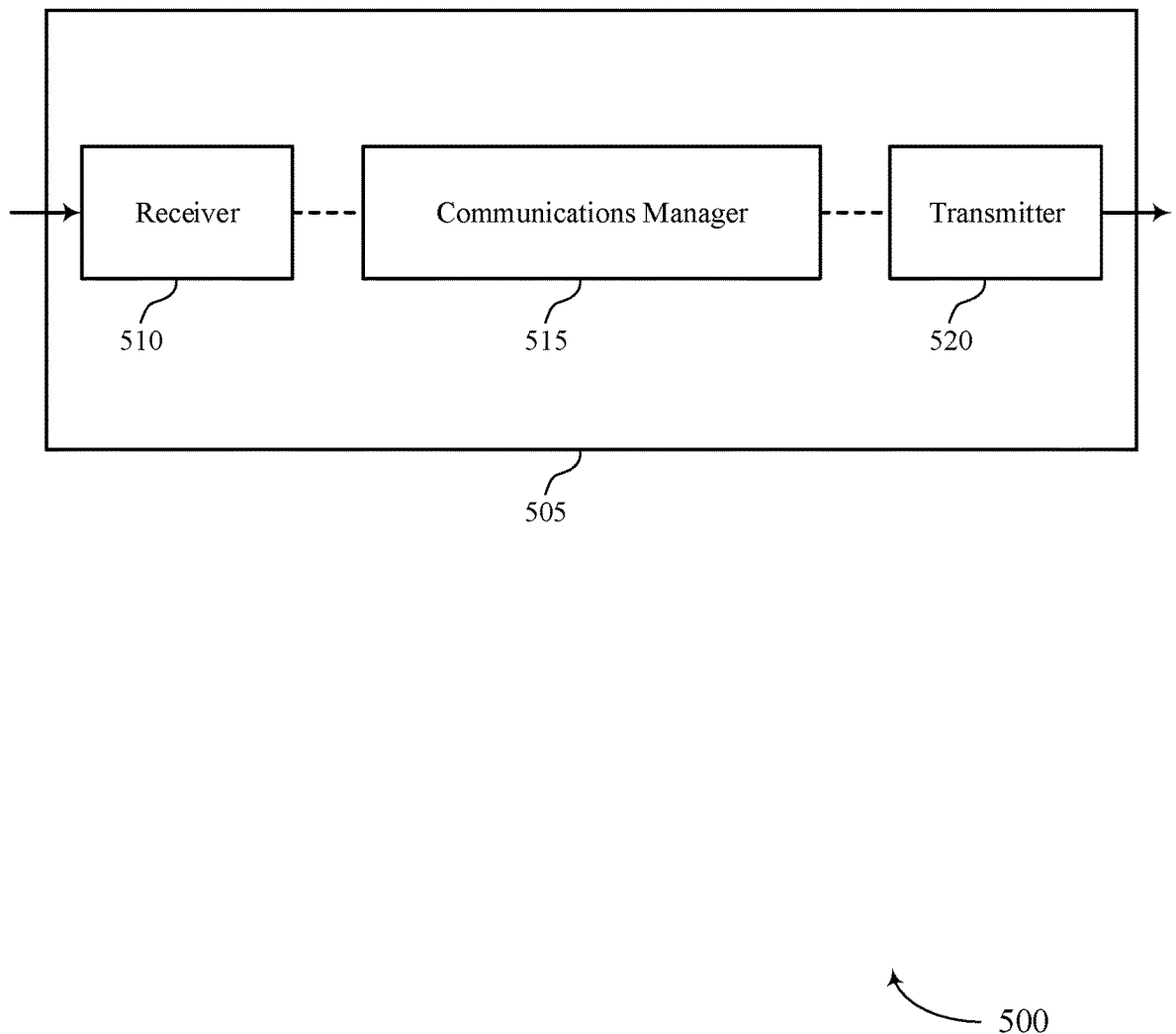
FIGS. 5 and 6 show block diagrams of devices that support signaling in asynchronous carrier aggregation in accordance with aspects of the present disclosure.

FIG. 5 shows a block diagram 500 of a device 505 that supports signaling in asynchronous carrier aggregation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to signaling in asynchronous carrier aggregation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify that the UE is configured to communicate with a first serving cell and with a second serving cell via asynchronous carrier aggregation, where a misalignment exists between a first SFN associated with the first serving cell and a second SFN associated with the second serving cell, select a SFN for transmission parameter calculation input from the first SFN and the second SFN based on existence of the misalignment, calculate a transmission parameter based on the selected SFN, and communicate with at least one of the first serving cell and the second serving cell based on the calculated transmission parameter.

The communications manager 515 as described herein may be implemented to realize one or more potential advantages. One implementation may allow the device 505 to save power and increase battery life by communicating with multiple base stations 105 (as shown in FIG. 1) more efficiently. For example, the device 505 may efficiently communicate with a base station 105 in an asynchronous CA configuration, as the device 505 may be able to resolve ambiguities arising from an SFN misalignment by selecting which SFN to use for calculating a transmission parameter. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
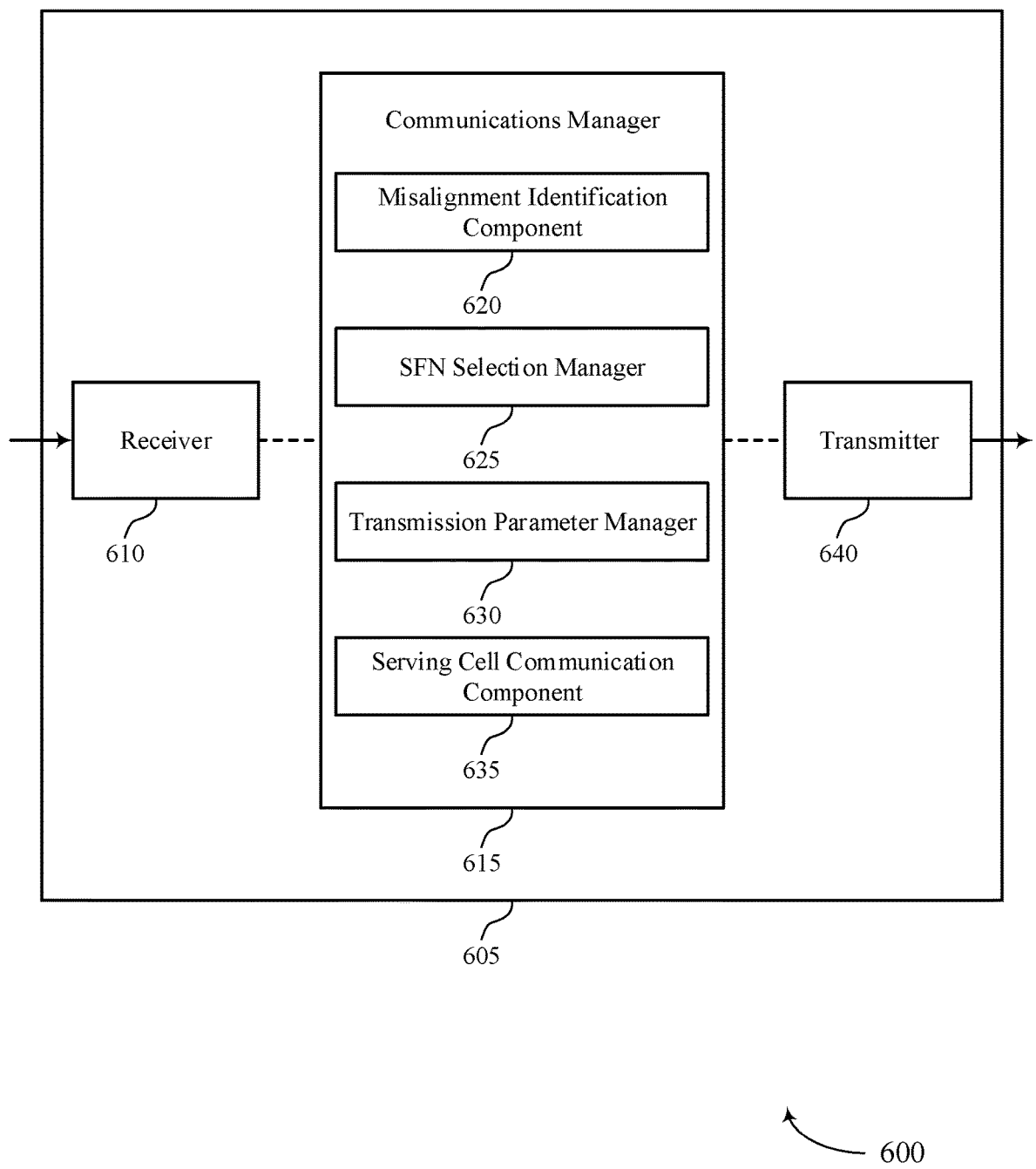

FIG. 6 shows a block diagram 600 of a device 605 that supports signaling in asynchronous carrier aggregation in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to signaling in asynchronous carrier aggregation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a misalignment identification component 620, a SFN selection manager 625, a transmission parameter manager 630, and a serving cell communication component 635. The communications manager 615 may be an example of aspects of the communications manager 810 described herein.

The misalignment identification component 620 may identify that the UE is configured to communicate with a first serving cell and with a second serving cell via asynchronous carrier aggregation, where a misalignment exists between a first SFN associated with the first serving cell and a second SFN associated with the second serving cell.

The SFN selection manager 625 may select an SFN for transmission parameter calculation input from the first SFN and the second SFN based on existence of the misalignment.

The transmission parameter manager 630 may calculate a transmission parameter based on the selected SFN.

The serving cell communication component 635 may communicate with at least one of the first serving cell and the second serving cell based on the calculated transmission parameter.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
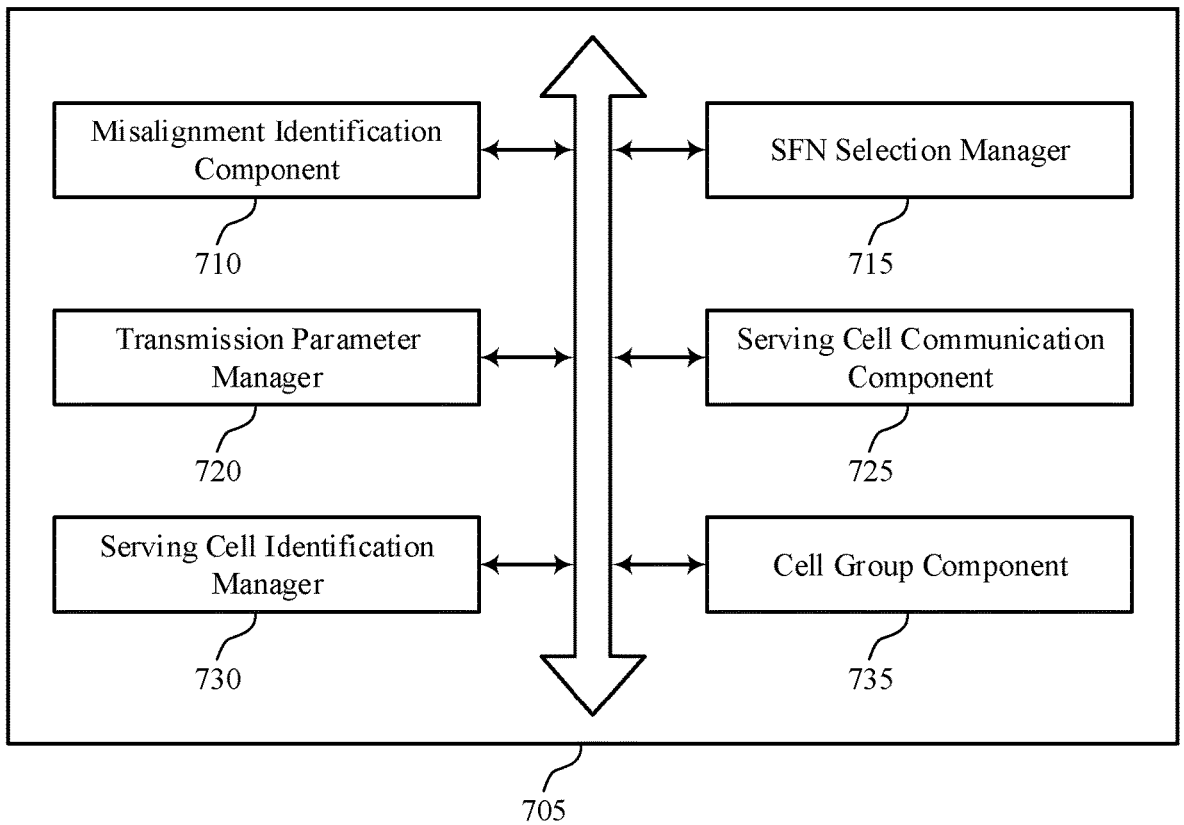
FIG. 7 shows a block diagram of a communications manager that supports signaling in asynchronous carrier aggregation in accordance with aspects of the present disclosure.

FIG. 7 shows a block diagram 700 of a communications manager 705 that supports signaling in asynchronous carrier aggregation in accordance with aspects of the present disclosure. The communications manager 705 may be an example of aspects of a communications manager 515, a communications manager 615, or a communications manager 810 described herein. The communications manager 705 may include a misalignment identification component 710, a SFN selection manager 715, a transmission parameter manager 720, a serving cell communication component 725, a serving cell identification manager 730, and a cell group component 735. Each of these modules may communicate, directly or indirectly, with one another (e.g., via one or more buses).

The misalignment identification component 710 may identify that the UE is configured to communicate with a first serving cell and with a second serving cell via asynchronous carrier aggregation, where a misalignment exists between a first SFN associated with the first serving cell and a second SFN associated with the second serving cell. In some examples, the misalignment identification component 710 may identify that the UE is further configured to communicate with one or more additional serving cells, where a second misalignment exists between the first SFN, the second SFN, and additional SFNs associated with the one or more additional serving cells.

The SFN selection manager 715 may select an SFN for transmission parameter calculation input from the first SFN and the second SFN based on existence of the misalignment. In some examples, the SFN selection manager 715 may select either the first SFN or the second SFN based on one of the first serving cell and the second serving cell being the configured serving cell. In some examples, the SFN selection manager 715 may select either the first SFN or the second SFN based on one of the first serving cell and the second serving cell being the current serving cell.

In some examples, the SFN selection manager 715 may select either the first SFN or the second SFN based on one of the first serving cell and the second serving cell having the smallest serving cell index of serving cells operating in Frequency Range 2. In some examples, the SFN selection manager 715 may select either the first SFN or the second SFN based on one of the first serving cell and the second serving cell having the largest serving cell index of serving cells operating in Frequency Range 2.

In some examples, the SFN selection manager 715 may select either the first SFN of the second SFN based on one of the first serving cell and the second serving cell being the primary cell. In some examples, the SFN selection manager 715 may select either the first SFN of the second SFN based on the indication. In some examples, the SFN selection manager 715 may update the selected SFN based on the second misalignment, where the updated SFN includes the first SFN, the second SFN, or one of the additional SFNs.

The transmission parameter manager 720 may calculate a transmission parameter based on the selected SFN. In some examples, the transmission parameter manager 720 may calculate the transmission parameter based on the updated SFN. In some cases, the transmission parameter includes a HARQ process identification for semi-persistent scheduling or configured grant operation. In some cases, the transmission parameter includes a slot associated with a downlink assignment occurrence in semi-persistent scheduling operation. In some cases, the transmission parameter includes one or more symbols associated with an uplink grant occurrence in configured grant operation. In some cases, the transmission parameter includes a starting point for an on-duration in a discontinuous reception cycle. In some cases, the transmission parameter includes a measurement gap timing for serving cell operation in Frequency Range 2. In some examples, the transmission parameter manager 720 may calculate a measurement gap for the serving cells operating in Frequency Range 2 based on the selected system frame number. In some examples, the transmission parameter manager 720 may calculate a measurement gap for serving cells in an MCG and in an SCG based on the selected system frame number.

The serving cell communication component 725 may communicate with at least one of the first serving cell and the second serving cell based on the calculated transmission parameter.

The serving cell identification manager 730 may identify that one of the first serving cell and the second serving cell is a configured serving cell configured for at least one of semi-persistent scheduling communications or configured grant communications. In some examples, the serving cell identification manager 730 may identify that one of the first serving cell and the second serving cell is a current serving cell.

In some examples, the serving cell identification manager 730 may identify that one of the first serving cell and the second serving cell is operating in Frequency Range 2 and has a smallest serving cell index of the first serving cell and the second serving cell operating in Frequency Range 2. In some examples, the serving cell identification manager 730 may identify that one of the first serving cell and the second serving cell is operating in Frequency Range 2 and has a largest serving cell index of the first serving cell and the second serving cell operating in Frequency Range 2.

In some examples, the serving cell identification manager 730 may receive an indication that one of the first serving cell or the second serving cell may be associated with the selected SFN. In some examples, the serving cell identification manager 730 may receive the indication via a radio resource control message. In some cases, the indication may include a cell index. In some cases, the first serving cell may be associated with a first RAT and the second serving cell may be associated with a second RAT. In some cases, the first RAT may be different from the second RAT.

The cell group component 735 may identify that the first serving cell and the second serving cell are part of a same cell group. In some examples, the cell group component 735 may identify a primary cell within the same cell group. In some cases, the primary cell of the same cell group is a PCell of an MCG. In some cases, the primary cell of the same cell group is a PSCell of an SCG.

Figure 8:
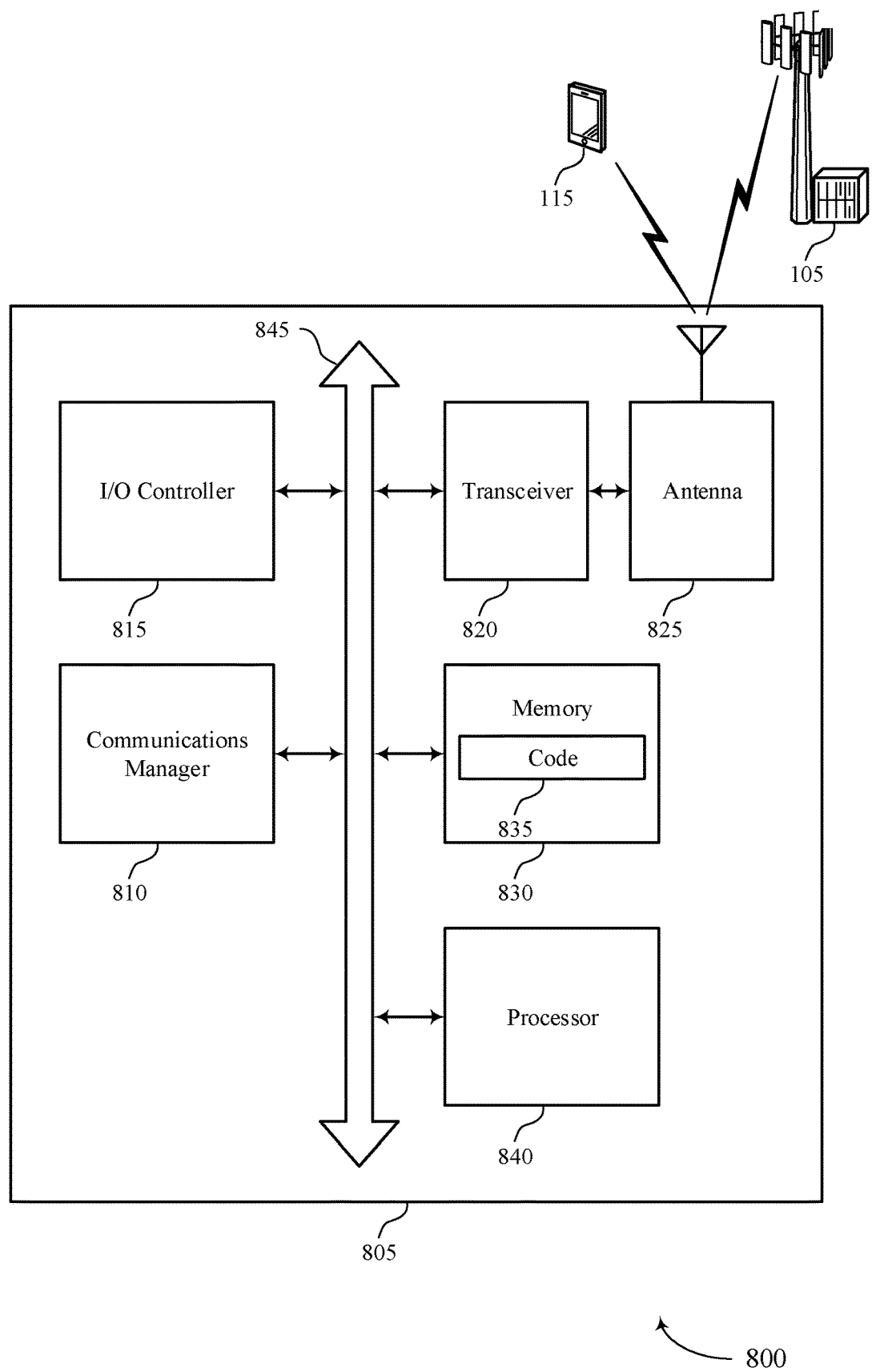
FIG. 8 shows a diagram of a system including a device that supports signaling in asynchronous carrier aggregation in accordance with aspects of the present disclosure.

FIG. 8 shows a diagram of a system 800 including a device 805 that supports signaling in asynchronous carrier aggregation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify that the UE is configured to communicate with a first serving cell and with a second serving cell via asynchronous carrier aggregation, where a misalignment exists between a first SFN associated with the first serving cell and a second SFN associated with the second serving cell, select a SFN for transmission parameter calculation input from the first SFN and the second SFN based on existence of the misalignment, calculate a transmission parameter based on the selected SFN, and communicate with at least one of the first serving cell and the second serving cell based on the calculated transmission parameter.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling in asynchronous carrier aggregation).

The processor 840 of the device 805 (e.g., controlling the receiver 510, the transmitter 520, or the transceiver 820) may reduce power consumption and increase communication efficiency based on selecting which SFN to use for calculation transmission parameters for communications with a serving cell. In some examples, the processor 840 of the device 805 may reconfigure parameters associated with calculating transmission parameters for communications with one or more serving cells. For example, the processor 840 of the device 805 may turn on one or more processing units for processing the communications, increase a processing clock, or a similar mechanism within the device 805. As such, when subsequent transmission parameters are calculated, the processor 840 may be ready to respond more efficiently through the reduction of a ramp up in processing power. The improvements in power saving and communication efficiency may further increase battery life at the device 805 (for example, by reducing or eliminating unnecessary or failed communications, etc.).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
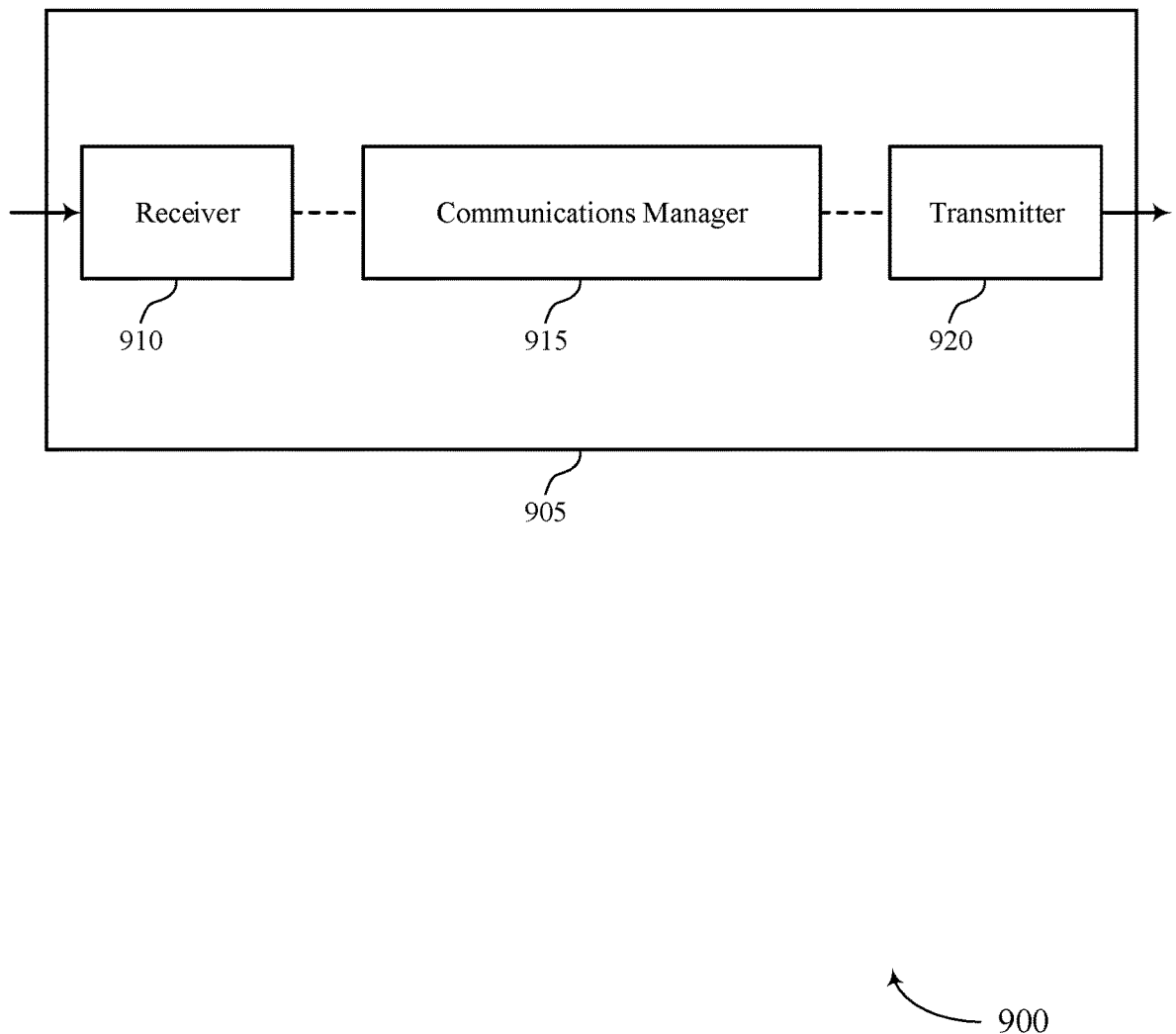
FIGS. 9 and 10 show block diagrams of devices that support signaling in asynchronous carrier aggregation in accordance with aspects of the present disclosure.

FIG. 9 shows a block diagram 900 of a device 905 that supports signaling in asynchronous carrier aggregation in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to signaling in asynchronous carrier aggregation, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a misalignment between a first SFN associated with the first serving cell and a second SFN associated with a second serving cell, where the first serving cell and the second serving cell are in communication with a UE via asynchronous carrier aggregation, identify a selected SFN for transmission parameter calculation input from the first SFN and the second SFN based on existence of the misalignment, calculate a transmission parameter based on the selected SFN, and communicate with the UE based on the calculated transmission parameter.

The communications manager 915 as described herein may be implemented to realize one or more potential advantages. One implementation may allow the device 905 to save power by communicating with a UE 115 (as shown in FIG. 1) more efficiently. For example, the device 905 may improve reliability in communications with a UE 115, as the device 905 may be able to identify an SFN selected at the UE 115 and adjust communications accordingly. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
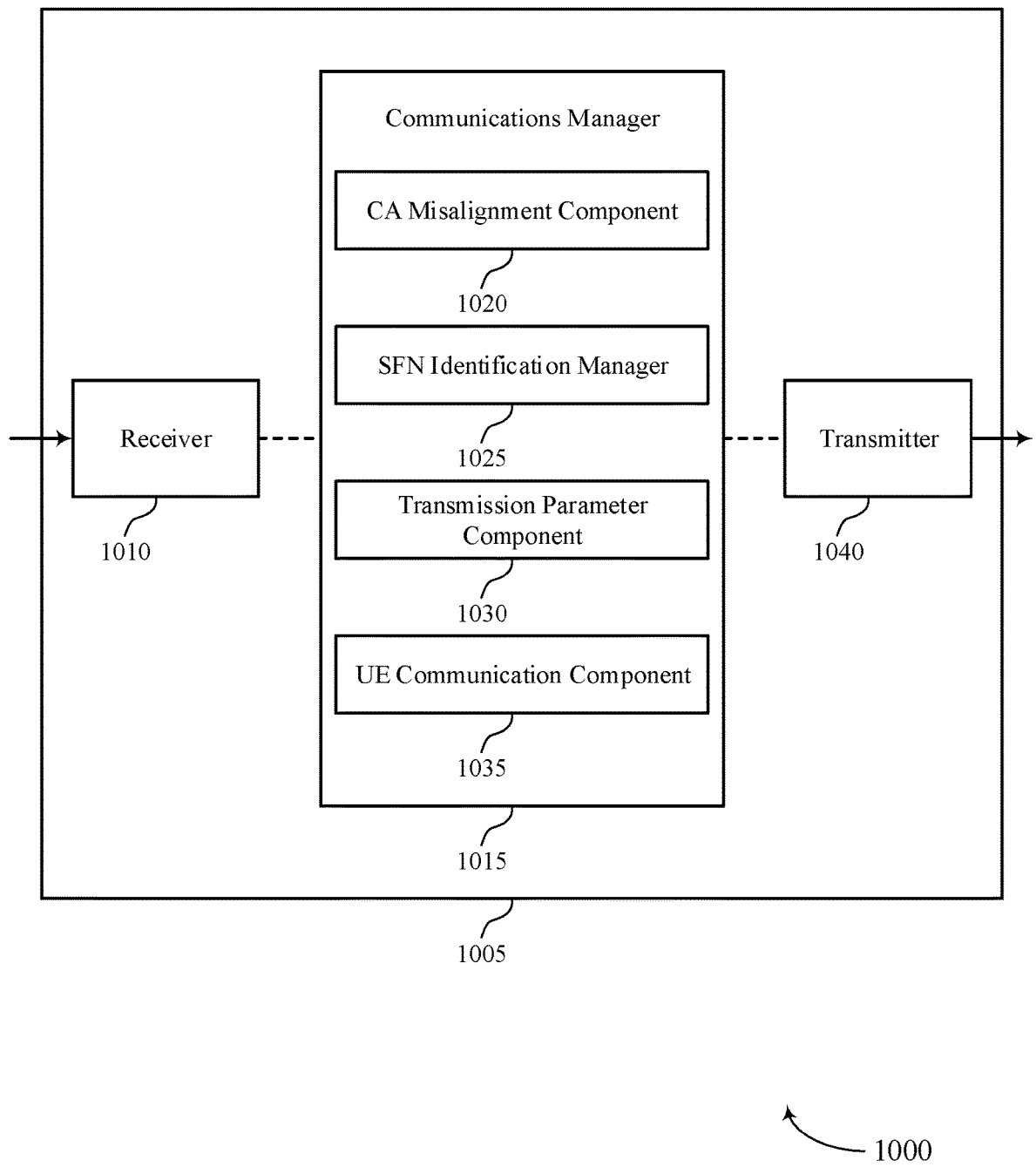

FIG. 10 shows a block diagram 1000 of a device 1005 that supports signaling in asynchronous carrier aggregation in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling in asynchronous carrier aggregation, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a CA misalignment component 1020, a SFN identification manager 1025, a transmission parameter component 1030, and a UE communication component 1035. The communications manager 1015 may be an example of aspects of the communications manager 1210 described herein.

The CA misalignment component 1020 may determine a misalignment between a first SFN associated with the first serving cell and a second SFN associated with a second serving cell, where the first serving cell and the second serving cell are in communication with a UE via asynchronous carrier aggregation.

The SFN identification manager 1025 may identify a selected SFN for transmission parameter calculation input from the first SFN and the second SFN based on existence of the misalignment.

The transmission parameter component 1030 may calculate a transmission parameter based on the selected SFN.

The UE communication component 1035 may communicate with the UE based on the calculated transmission parameter.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
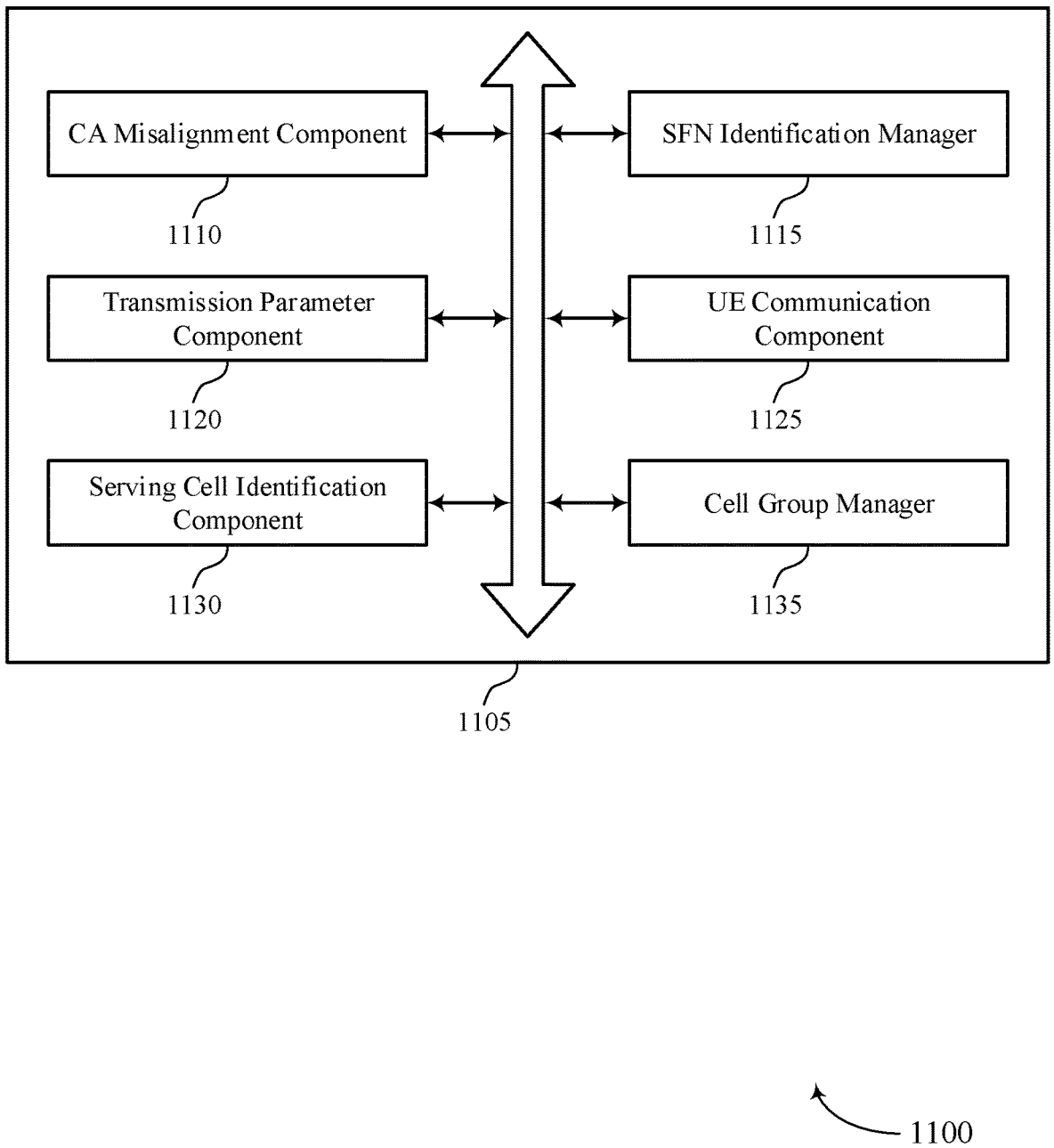
FIG. 11 shows a block diagram of a communications manager that supports signaling in asynchronous carrier aggregation in accordance with aspects of the present disclosure.

FIG. 11 shows a block diagram 1100 of a communications manager 1105 that supports signaling in asynchronous carrier aggregation in accordance with aspects of the present disclosure. The communications manager 1105 may be an example of aspects of a communications manager 915, a communications manager 1015, or a communications manager 1210 described herein. The communications manager 1105 may include a CA misalignment component 1110, an SFN identification manager 1115, a transmission parameter component 1120, a UE communication component 1125, a serving cell identification component 1130, and a cell group manager 1135. Each of these modules may communicate, directly or indirectly, with one another (e.g., via one or more buses).

The CA misalignment component 1110 may determine a misalignment between a first SFN associated with the first serving cell and a second SFN associated with a second serving cell, where the first serving cell and the second serving cell are in communication with a UE via asynchronous carrier aggregation. In some examples, the CA misalignment component 1110 may identify that the UE is further configured to communicate with one or more additional serving cells, where a second misalignment exists between the first SFN, the second SFN, and additional SFNs associated with the one or more additional serving cells.

The SFN identification manager 1115 may identify a selected SFN for transmission parameter calculation input from the first SFN and the second SFN based on existence of the misalignment. In some examples, the SFN identification manager 1115 may identify either the first SFN or the second SFN as the selected SFN based on one of the first serving cell and the second serving cell being the configured serving cell. In some examples, the SFN identification manager 1115 may identify either the first SFN or the second SFN as the selected SFN based on one of the first serving cell and the second serving cell being the current serving cell.

In some examples, the SFN identification manager 1115 may identify either the first SFN or the second SFN as the selected SFN based on one of the first serving cell and the second serving cell having the smallest serving cell index of serving cells operating in Frequency Range 2. In some examples, the SFN identification manager 1115 may identify either the first SFN or the second SFN as the selected SFN based on one of the first serving cell and the second serving cell having the largest serving cell index of serving cells operating in Frequency Range 2.

In some examples, the SFN identification manager 1115 may identify either the first SFN or the second SFN as the selected SFN based on one of the first serving cell and the second serving cell being the primary cell. In some examples, the SFN identification manager 1115 may identify either the first SFN or the second SFN as the selected SFN based on the transmitted indication. In some examples, the SFN identification manager 1115 may update the selected SFN based on the second misalignment, where the updated SFN includes the first SFN, the second SFN, or one of the additional SFNs.

The transmission parameter component 1120 may calculate a transmission parameter based on the selected SFN. In some examples, the transmission parameter component 1120 may calculate the transmission parameter based on the updated SFN. In some cases, the transmission parameter includes a HARQ process identification for semi-persistent scheduling or configured grant operation. In some cases, the transmission parameter includes a slot associated with a downlink assignment occurrence in semi-persistent scheduling operation. In some cases, the transmission parameter includes one or more symbols associated with an uplink grant occurrence in configured grant operation. In some cases, the transmission parameter includes a starting point for an on-duration in a discontinuous reception cycle. In some examples, the transmission parameter component 1120 may calculate a measurement gap for the serving cells operating in Frequency Range 2 based on the selected system frame number. In some examples, the transmission parameter component 1120 may calculate a measurement gap for serving cells in an MCG and in an SCG based on the selected system frame number.

In some cases, the transmission parameter includes a measurement gap timing for serving cell operation in Frequency Range 2.

The UE communication component 1125 may communicate with the UE based on the calculated transmission parameter.

The serving cell identification component 1130 may identify that one of the first serving cell and the second serving cell is a configured serving cell configured for at least one of semi-persistent scheduling communications or configured grant communications. In some examples, the serving cell identification component 1130 may identify that one of the first serving cell and the second serving cell is a current serving cell.

In some examples, the serving cell identification component 1130 may identify that one of the first serving cell and the second serving cell is operating in Frequency Range 2 and has a smallest serving cell index of serving cells operating in Frequency Range 2. In some examples, the serving cell identification component 1130 may identify that one of the first serving cell and the second serving cell is operating in Frequency Range 2 and has a largest serving cell index of serving cells operating in Frequency Range 2.

In some examples, the serving cell identification component 1130 may transmit an indication that one of the first serving cell or the second serving cell may be associated with the selected SFN. In some examples, the serving cell identification component 1130 may transmit the indication via a radio resource control message. In some cases, the indication includes a cell index. In some cases, the first serving cell may be associated with a first RAT and the second serving cell may be associated with a second RAT. In some cases, the first RAT may be different from the second RAT.

The cell group manager 1135 may identify that the first serving cell and the second serving cell are part of a same cell group. In some examples, the cell group manager 1135 may identify a primary cell within the same cell group. In some cases, the primary cell of the same cell group may be a PCell of an MCG. In some cases, the primary cell of the same cell group may be a PSCell of an SCG.

Figure 12:
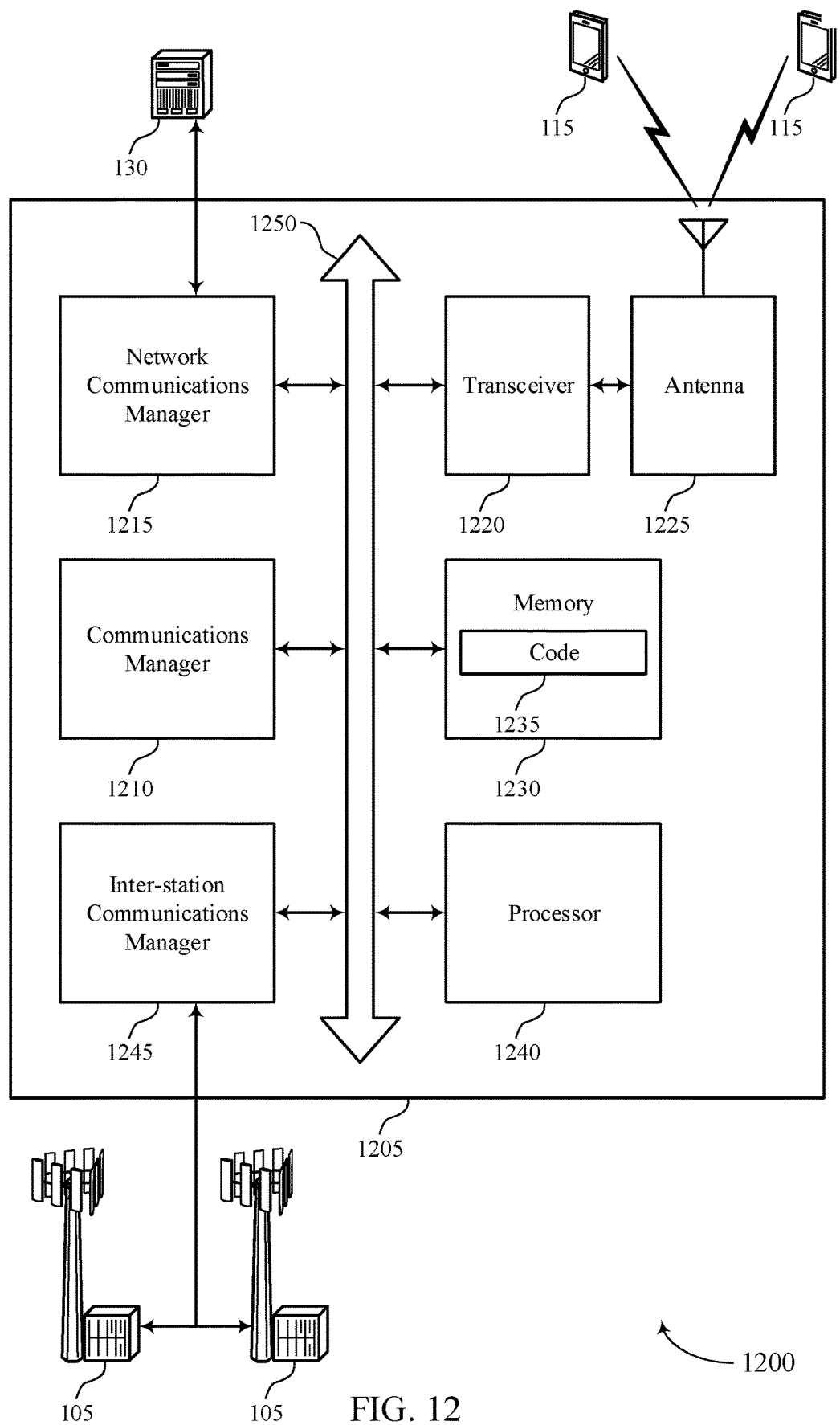
FIG. 12 shows a diagram of a system including a device that supports signaling in asynchronous carrier aggregation in accordance with aspects of the present disclosure.

FIG. 12 shows a diagram of a system 1200 including a device 1205 that supports signaling in asynchronous carrier aggregation in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine a misalignment between a first SFN associated with the first serving cell and a second SFN associated with a second serving cell, where the first serving cell and the second serving cell are in communication with a UE via asynchronous carrier aggregation, identify a selected SFN for transmission parameter calculation input from the first SFN and the second SFN based on existence of the misalignment, calculate a transmission parameter based on the selected SFN, and communicate with the UE based on the calculated transmission parameter.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting signaling in asynchronous carrier aggregation).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
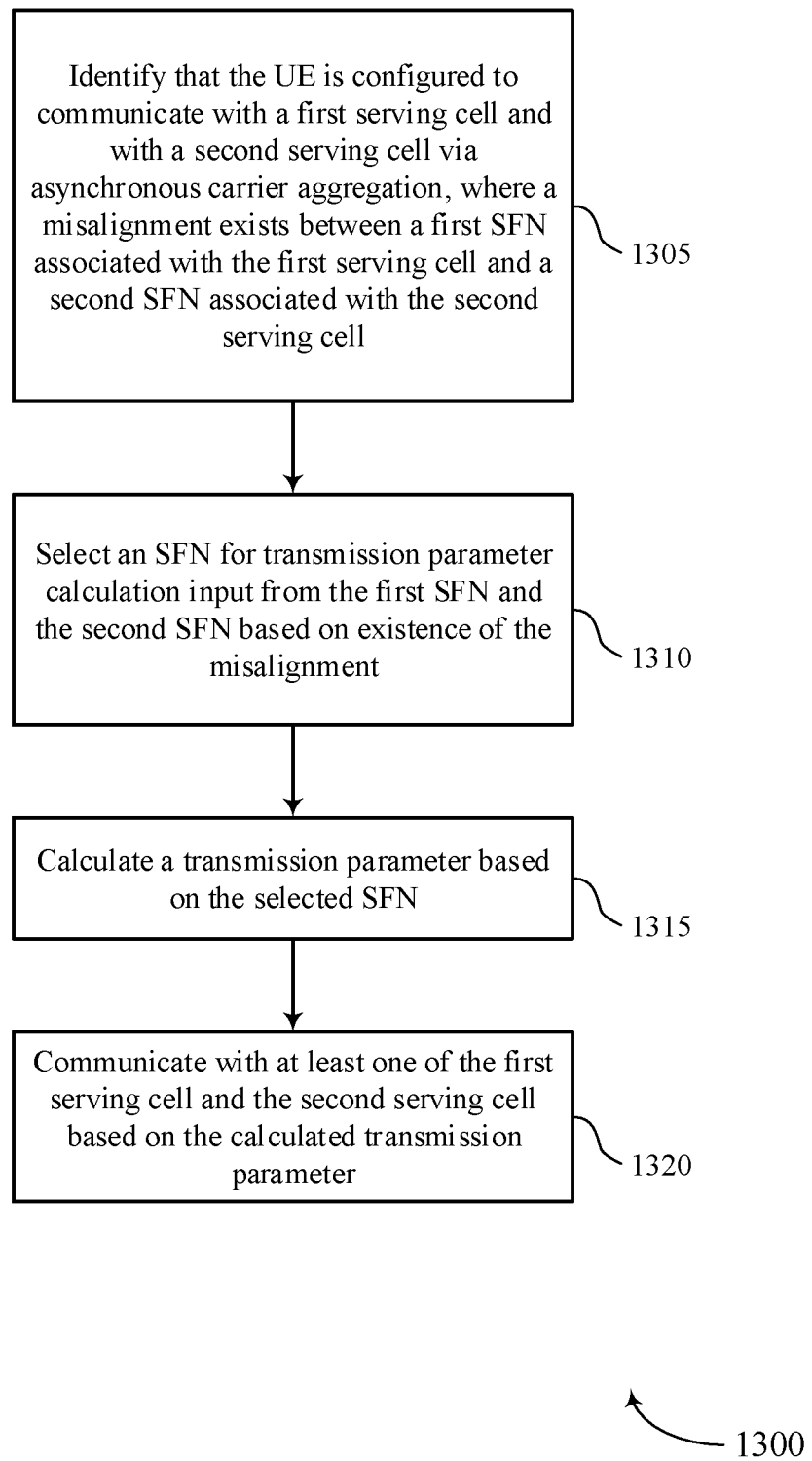
FIGS. 13 through 18 show flowcharts illustrating methods that support signaling in asynchronous carrier aggregation in accordance with aspects of the present disclosure.

FIG. 13 shows a flowchart illustrating a method 1300 that supports signaling in asynchronous carrier aggregation in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify that the UE is configured to communicate with a first serving cell and with a second serving cell via asynchronous carrier aggregation, where a misalignment exists between a first SFN associated with the first serving cell and a second SFN associated with the second serving cell. The operations of 1305 may be performed according to the methods described herein. In some examples, aspects of the operations of 1305 may be performed by a misalignment identification component as described with reference to FIGS. 5 through 8.

At 1310, the UE may select an SFN for transmission parameter calculation input from the first SFN and the second SFN based on existence of the misalignment. The operations of 1310 may be performed according to the methods described herein. In some examples, aspects of the operations of 1310 may be performed by an SFN selection manager as described with reference to FIGS. 5 through 8.

At 1315, the UE may calculate a transmission parameter based on the selected SFN. The operations of 1315 may be performed according to the methods described herein. In some examples, aspects of the operations of 1315 may be performed by a transmission parameter manager as described with reference to FIGS. 5 through 8.

At 1320, the UE may communicate with at least one of the first serving cell and the second serving cell based on the calculated transmission parameter. The operations of 1320 may be performed according to the methods described herein. In some examples, aspects of the operations of 1320 may be performed by a serving cell communication component as described with reference to FIGS. 5 through 8.

Figure 14:
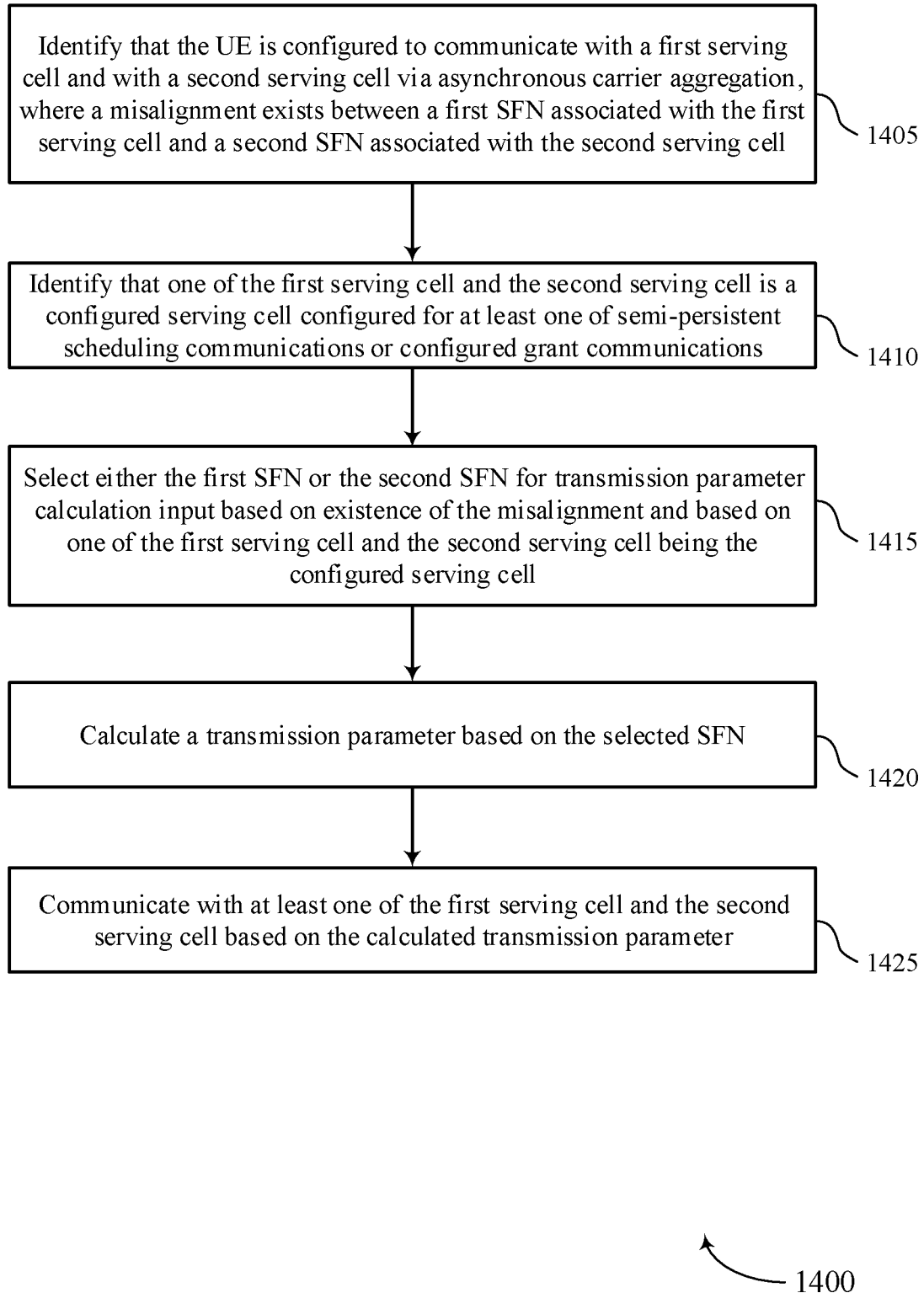

FIG. 14 shows a flowchart illustrating a method 1400 that supports signaling in asynchronous carrier aggregation in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify that the UE is configured to communicate with a first serving cell and with a second serving cell via asynchronous carrier aggregation, where a misalignment exists between a first SFN associated with the first serving cell and a second SFN associated with the second serving cell. The operations of 1405 may be performed according to the methods described herein. In some examples, aspects of the operations of 1405 may be performed by a misalignment identification component as described with reference to FIGS. 5 through 8.

At 1410, the UE may identify that one of the first serving cell and the second serving cell is a configured serving cell configured for at least one of semi-persistent scheduling communications or configured grant communications. The operations of 1410 may be performed according to the methods described herein. In some examples, aspects of the operations of 1410 may be performed by a serving cell identification manager as described with reference to FIGS. 5 through 8.

At 1415, the UE may select either the first SFN or the second SFN for transmission parameter calculation input based on existence of the misalignment and based on one of the first serving cell and the second serving cell being the configured serving cell. The operations of 1415 may be performed according to the methods described herein. In some examples, aspects of the operations of 1415 may be performed by an SFN selection manager as described with reference to FIGS. 5 through 8.

At 1420, the UE may calculate a transmission parameter based on the selected SFN. The operations of 1420 may be performed according to the methods described herein. In some examples, aspects of the operations of 1420 may be performed by a transmission parameter manager as described with reference to FIGS. 5 through 8.

At 1425, the UE may communicate with at least one of the first serving cell and the second serving cell based on the calculated transmission parameter. The operations of 1425 may be performed according to the methods described herein. In some examples, aspects of the operations of 1425 may be performed by a serving cell communication component as described with reference to FIGS. 5 through 8.

Figure 15:
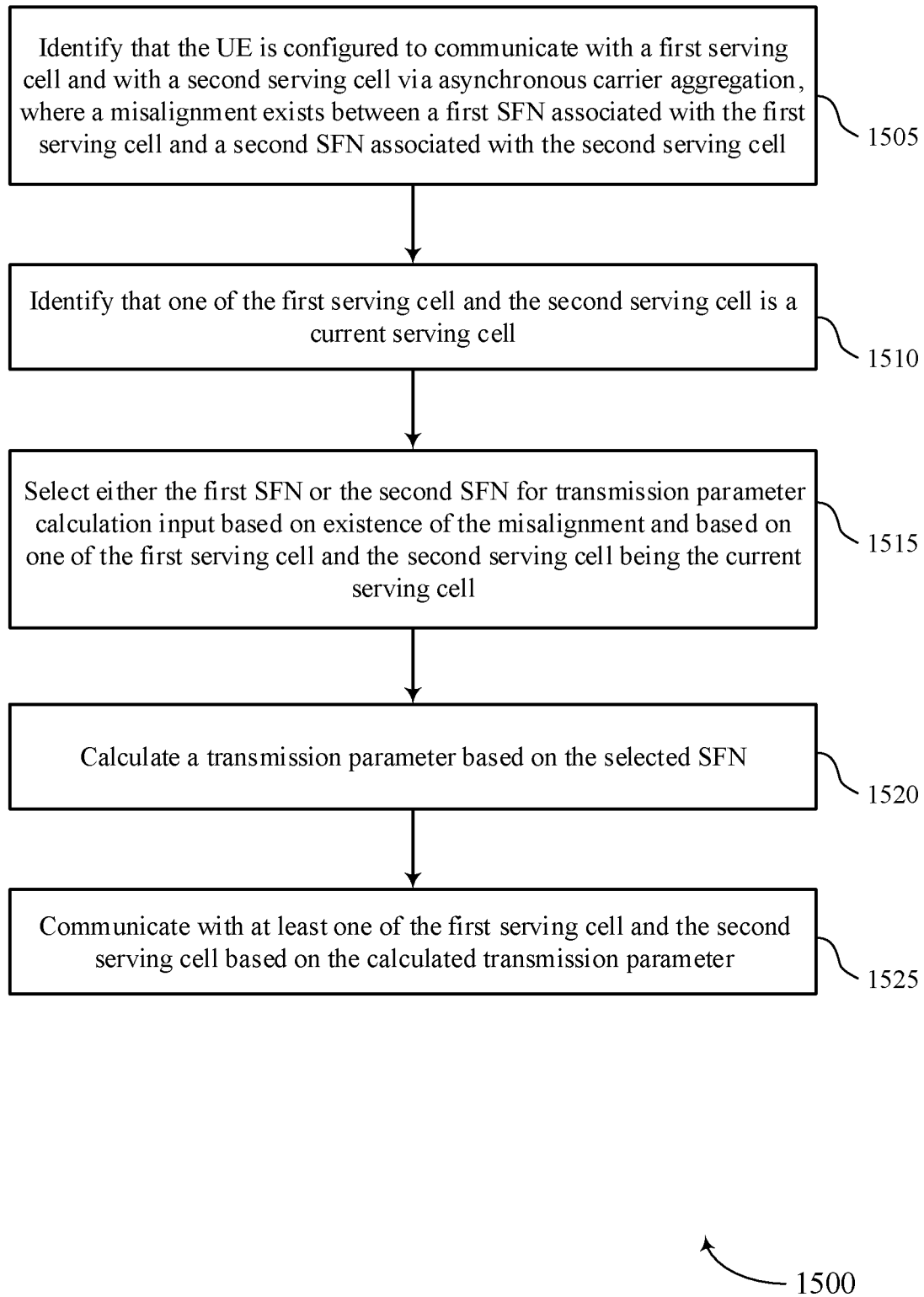

FIG. 15 shows a flowchart illustrating a method 1500 that supports signaling in asynchronous carrier aggregation in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify that the UE is configured to communicate with a first serving cell and with a second serving cell via asynchronous carrier aggregation, where a misalignment exists between a first SFN associated with the first serving cell and a second SFN associated with the second serving cell. The operations of 1505 may be performed according to the methods described herein. In some examples, aspects of the operations of 1505 may be performed by a misalignment identification component as described with reference to FIGS. 5 through 8.

At 1510, the UE may identify that one of the first serving cell and the second serving cell is a current serving cell. The operations of 1510 may be performed according to the methods described herein. In some examples, aspects of the operations of 1510 may be performed by a serving cell identification manager as described with reference to FIGS. 5 through 8.

At 1515, the UE may select either the first SFN or the second SFN for transmission parameter calculation input based on existence of the misalignment and based on one of the first serving cell and the second serving cell being the current serving cell. The operations of 1515 may be performed according to the methods described herein. In some examples, aspects of the operations of 1515 may be performed by an SFN selection manager as described with reference to FIGS. 5 through 8.

At 1520, the UE may calculate a transmission parameter based on the selected SFN. The operations of 1520 may be performed according to the methods described herein. In some examples, aspects of the operations of 1520 may be performed by a transmission parameter manager as described with reference to FIGS. 5 through 8.

At 1525, the UE may communicate with at least one of the first serving cell and the second serving cell based on the calculated transmission parameter. The operations of 1525 may be performed according to the methods described herein. In some examples, aspects of the operations of 1525 may be performed by a serving cell communication component as described with reference to FIGS. 5 through 8.

Figure 16:
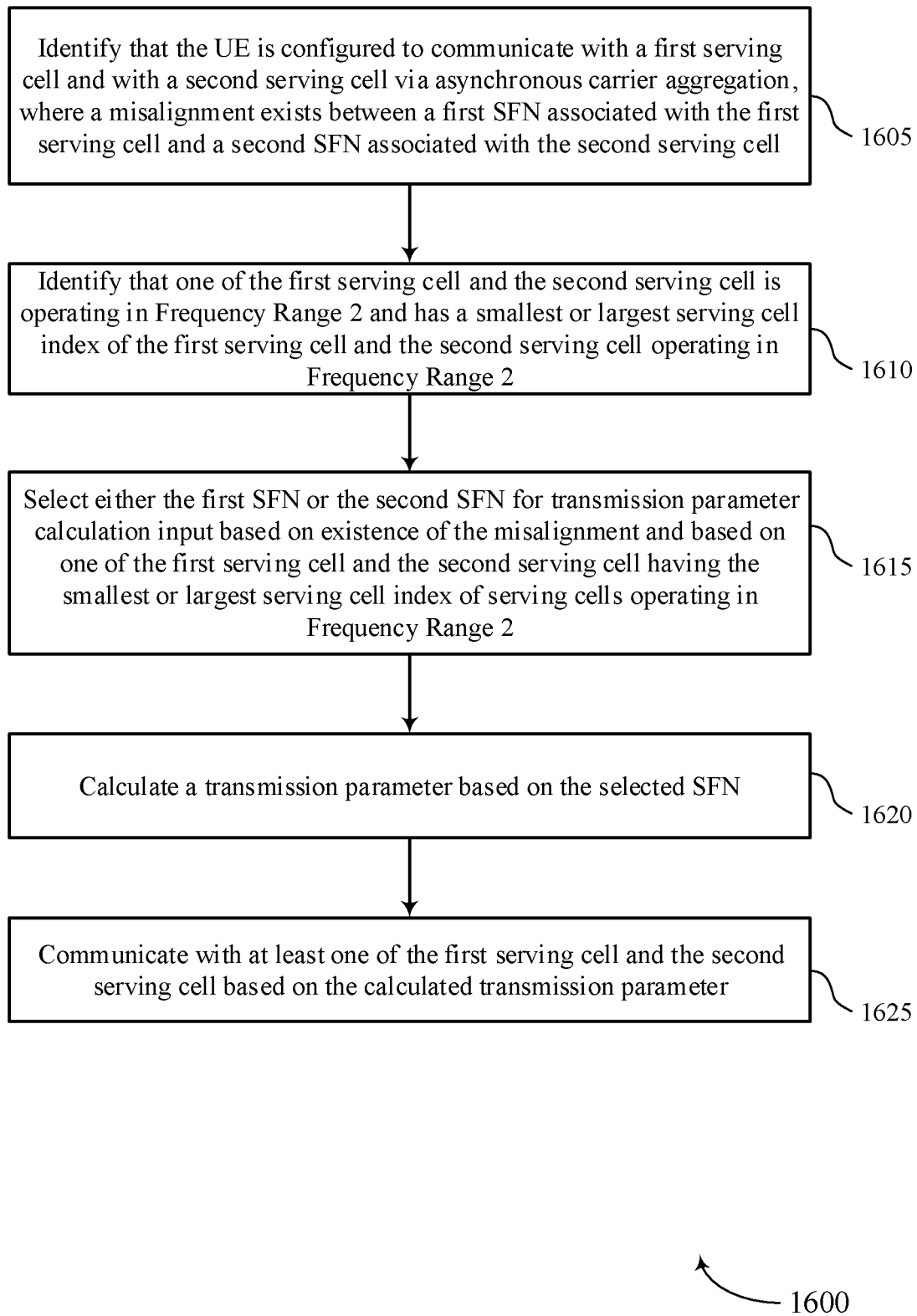

FIG. 16 shows a flowchart illustrating a method 1600 that supports signaling in asynchronous carrier aggregation in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify that the UE is configured to communicate with a first serving cell and with a second serving cell via asynchronous carrier aggregation, where a misalignment exists between a first SFN associated with the first serving cell and a second SFN associated with the second serving cell. The operations of 1605 may be performed according to the methods described herein. In some examples, aspects of the operations of 1605 may be performed by a misalignment identification component as described with reference to FIGS. 5 through 8.

At 1610, the UE may identify that one of the first serving cell and the second serving cell is operating in Frequency Range 2 and has a smallest or largest serving cell index of the first serving cell and the second serving cell operating in Frequency Range 2. The operations of 1610 may be performed according to the methods described herein. In some examples, aspects of the operations of 1610 may be performed by a serving cell identification manager as described with reference to FIGS. 5 through 8.

At 1615, the UE may select either the first SFN or the second SFN for transmission parameter calculation input based on existence of the misalignment and based on one of the first serving cell and the second serving cell having the smallest or largest serving cell index of serving cells operating in Frequency Range 2. The operations of 1615 may be performed according to the methods described herein. In some examples, aspects of the operations of 1615 may be performed by an SFN selection manager as described with reference to FIGS. 5 through 8.

At 1620, the UE may calculate a transmission parameter based on the selected SFN. The operations of 1620 may be performed according to the methods described herein. In some examples, aspects of the operations of 1620 may be performed by a transmission parameter manager as described with reference to FIGS. 5 through 8.

At 1625, the UE may communicate with at least one of the first serving cell and the second serving cell based on the calculated transmission parameter. The operations of 1625 may be performed according to the methods described herein. In some examples, aspects of the operations of 1625 may be performed by a serving cell communication component as described with reference to FIGS. 5 through 8.

Figure 17:
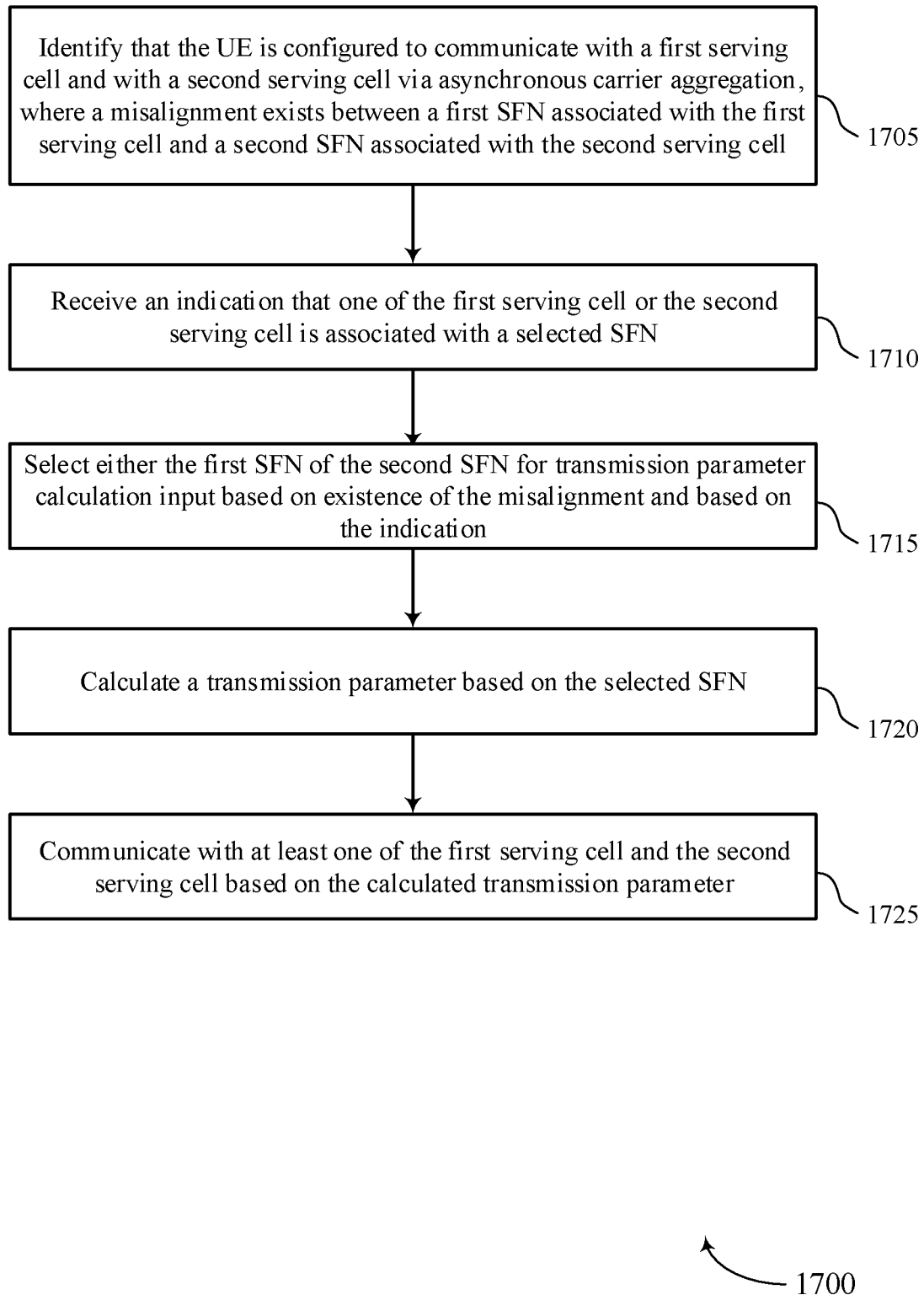

FIG. 17 shows a flowchart illustrating a method 1700 that supports signaling in asynchronous carrier aggregation in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may identify that the UE is configured to communicate with a first serving cell and with a second serving cell via asynchronous carrier aggregation, where a misalignment exists between a first SFN associated with the first serving cell and a second SFN associated with the second serving cell. The operations of 1705 may be performed according to the methods described herein. In some examples, aspects of the operations of 1705 may be performed by a misalignment identification component as described with reference to FIGS. 5 through 8.

At 1710, the UE may receive an indication that one of the first serving cell or the second serving cell is associated with a selected SFN. The operations of 1710 may be performed according to the methods described herein. In some examples, aspects of the operations of 1710 may be performed by a serving cell identification manager as described with reference to FIGS. 5 through 8.

At 1715, the UE may select either the first SFN of the second SFN for transmission parameter calculation input based on existence of the misalignment and based on the indication. The operations of 1715 may be performed according to the methods described herein. In some examples, aspects of the operations of 1715 may be performed by an SFN selection manager as described with reference to FIGS. 5 through 8.

At 1720, the UE may calculate a transmission parameter based on the selected SFN. The operations of 1720 may be performed according to the methods described herein. In some examples, aspects of the operations of 1720 may be performed by a transmission parameter manager as described with reference to FIGS. 5 through 8.

At 1725, the UE may communicate with at least one of the first serving cell and the second serving cell based on the calculated transmission parameter. The operations of 1725 may be performed according to the methods described herein. In some examples, aspects of the operations of 1725 may be performed by a serving cell communication component as described with reference to FIGS. 5 through 8.

Figure 18:
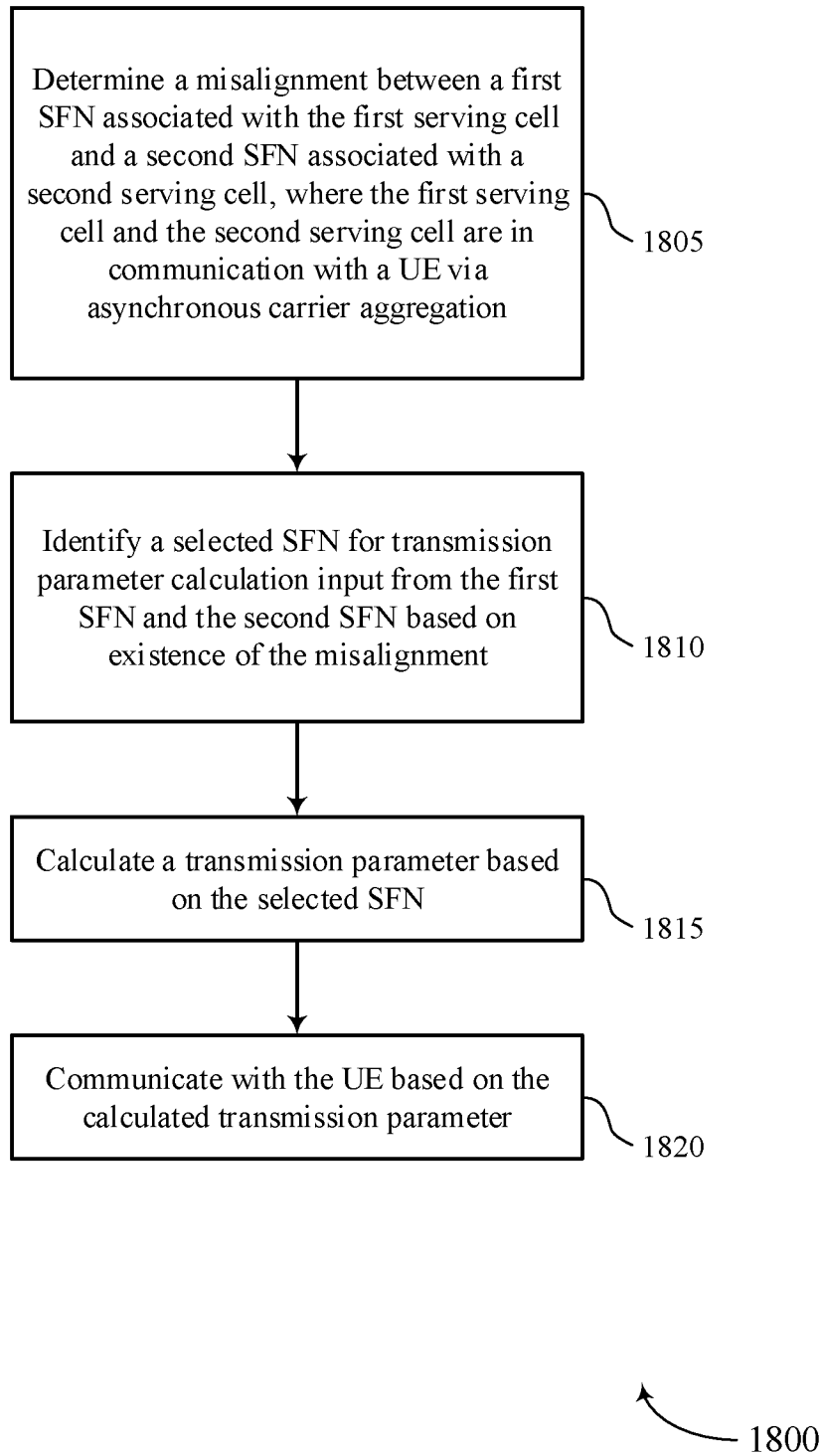

FIG. 18 shows a flowchart illustrating a method 1800 that supports signaling in asynchronous carrier aggregation in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may determine a misalignment between a first SFN associated with the first serving cell and a second SFN associated with a second serving cell, where the first serving cell and the second serving cell are in communication with a UE via asynchronous carrier aggregation. The operations of 1805 may be performed according to the methods described herein. In some examples, aspects of the operations of 1805 may be performed by a CA misalignment component as described with reference to FIGS. 9 through 12.

At 1810, the base station may identify a selected SFN for transmission parameter calculation input from the first SFN and the second SFN based on existence of the misalignment. The operations of 1810 may be performed according to the methods described herein. In some examples, aspects of the operations of 1810 may be performed by an SFN identification manager as described with reference to FIGS. 9 through 12.

At 1815, the base station may calculate a transmission parameter based on the selected SFN. The operations of 1815 may be performed according to the methods described herein. In some examples, aspects of the operations of 1815 may be performed by a transmission parameter component as described with reference to FIGS. 9 through 12.

At 1820, the base station may communicate with the UE based on the calculated transmission parameter. The operations of 1820 may be performed according to the methods described herein. In some examples, aspects of the operations of 1820 may be performed by a UE communication component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present invention:

Aspect 1: A method for wireless communications at a user equipment (UE), comprising: identifying that the UE is configured to communicate with a first serving cell and with a second serving cell via asynchronous carrier aggregation, wherein a misalignment exists between a first system frame number associated with the first serving cell and a second system frame number associated with the second serving cell; selecting a system frame number for transmission parameter calculation input from the first system frame number and the second system frame number based at least in part on existence of the misalignment; calculating a transmission parameter based at least in part on the selected system frame number; and communicating with at least one of the first serving cell and the second serving cell based at least in part on the calculated transmission parameter.

Aspect 2: The method of aspect 1, wherein selecting the system frame number for transmission parameter calculation input comprises: identifying that one of the first serving cell and the second serving cell is a configured serving cell configured for at least one of semi-persistent scheduling communications or configured grant communications; and selecting either the first system frame number or the second system frame number based at least in part on one of the first serving cell and the second serving cell being the configured serving cell.

Aspect 3: The method of any one of aspects 1 or 2, wherein selecting the system frame number for transmission parameter calculation input comprises: identifying that one of the first serving cell and the second serving cell is a current serving cell; and selecting either the first system frame number or the second system frame number based at least in part on one of the first serving cell and the second serving cell being the current serving cell.

Aspect 4: The method of any one of aspects 1 through 3, wherein selecting the system frame number for transmission parameter calculation input comprises: identifying that one of the first serving cell and the second serving cell is operating in Frequency Range 2 and has a smallest serving cell index of the first serving cell and the second serving cell operating in Frequency Range 2; and selecting either the first system frame number or the second system frame number based at least in part on one of the first serving cell and the second serving cell having the smallest serving cell index of serving cells operating in Frequency Range 2.

Aspect 5: The method of aspect 4, wherein calculating the transmission parameter comprises: calculating a measurement gap for the serving cells operating in Frequency Range 2 based at least in part on the selected system frame number.

Aspect 6: The method of any one of aspects 4 or 5, wherein calculating the transmission parameter comprises: calculating a measurement gap for serving cells in a master cell group (MCG) and in a secondary cell group (SCG) based at least in part on the selected system frame number.

Aspect 7: The method of any one of aspects 1 through 6, wherein selecting the system frame number for transmission parameter calculation input comprises: identifying that one of the first serving cell and the second serving cell is operating in Frequency Range 2 and has a largest serving cell index of the first serving cell and the second serving cell operating in Frequency Range 2; and selecting either the first system frame number or the second system frame number based at least in part on one of the first serving cell and the second serving cell having the largest serving cell index of serving cells operating in Frequency Range 2.

Aspect 8: The method of aspect 7, wherein calculating the transmission parameter comprises: calculating a measurement gap for the serving cells operating in Frequency Range 2 based at least in part on the selected system frame number.

Aspect 9: The method of any one of aspects 7 or 8, wherein calculating the transmission parameter comprises: calculating a measurement gap for serving cells in a master cell group (MCG) and in a secondary cell group (SCG) based at least in part on the selected system frame number.

Aspect 10: The method of any one of aspects 1 through 9, wherein selecting the system frame number for transmission parameter calculation input comprises: identifying that the first serving cell and the second serving cell are part of a same cell group; identifying a primary cell within the same cell group; and selecting either the first system frame number of the second system frame number based at least in part on one of the first serving cell and the second serving cell being the primary cell.

Aspect 11: The method of aspect 10, wherein the primary cell of the same cell group is a primary cell (PCell) of a master cell group (MCG).

Aspect 12: The method of any one of aspects 10 or 11, wherein the primary cell of the same cell group is a primary secondary cell (PSCell) of a secondary cell group (SCG).

Aspect 13: The method of any one of aspects 1 through 12, wherein selecting the system frame number for transmission parameter calculation input comprises: receiving an indication that one of the first serving cell or the second serving cell is associated with the selected system frame number; and selecting either the first system frame number of the second system frame number based at least in part on the indication.

Aspect 14: The method of aspect 13, wherein the indication comprises a cell index.

Aspect 15: The method of any one of aspects 13 or 14, wherein receiving the indication comprises: receiving the indication via a radio resource control message.

Aspect 16: The method of any one of aspects 1 through 15, wherein the transmission parameter comprises a hybrid automatic repeat request (HARQ) process identification for semi-persistent scheduling or configured grant operation.

Aspect 17: The method of any one of aspects 1 through 16, wherein the transmission parameter comprises a slot associated with a downlink assignment occurrence in semi-persistent scheduling operation.

Aspect 18: The method of any one of aspects 1 through 17, wherein the transmission parameter comprises one or more symbols associated with an uplink grant occurrence in configured grant operation.

Aspect 19: The method of any one of aspects 1 through 18, wherein the transmission parameter comprises a starting point for an on-duration in a discontinuous reception cycle.

Aspect 20: The method of any one of aspects 1 through 19, wherein the transmission parameter comprises a measurement gap timing for serving cell operation in Frequency Range 2.

Aspect 21: The method of any one of aspects 1 through 20, wherein the first serving cell is associated with a first radio access technology (RAT) and the second serving cell is associated with a second RAT.

Aspect 22: The method of aspect 21, wherein the first RAT is different from the second RAT.

Aspect 23: The method of any one of aspects 1 through 22, further comprising: identifying that the UE is further configured to communicate with one or more additional serving cells, wherein a second misalignment exists between the first system frame number, the second system frame number, and additional system frame numbers associated with the one or more additional serving cells; updating the selected system frame number based at least in part on the second misalignment, wherein the updated system frame number comprises the first system frame number, the second system frame number, or one of the additional system frame numbers; and calculating the transmission parameter based at least in part on the updated system frame number.

Aspect 24: A method for wireless communications at a first serving cell, comprising: determining a misalignment between a first system frame number associated with the first serving cell and a second system frame number associated with a second serving cell, wherein the first serving cell and the second serving cell are in communication with a user equipment (UE) via asynchronous carrier aggregation; identifying a selected system frame number for transmission parameter calculation input from the first system frame number and the second system frame number based at least in part on existence of the misalignment; calculating a transmission parameter based at least in part on the selected system frame number; and communicating with the UE based at least in part on the calculated transmission parameter.

Aspect 25: The method of aspect 24, wherein identifying the selected system frame number for transmission parameter calculation input comprises: identifying that one of the first serving cell and the second serving cell is a configured serving cell configured for at least one of semi-persistent scheduling communications or configured grant communications; and identifying either the first system frame number or the second system frame number as the selected system frame number based at least in part on one of the first serving cell and the second serving cell being the configured serving cell.

Aspect 26: The method of any one of aspects 24 or 25, wherein identifying the selected system frame number for transmission parameter calculation input comprises: identifying that one of the first serving cell and the second serving cell is a current serving cell; and identifying either the first system frame number or the second system frame number as the selected system frame number based at least in part on one of the first serving cell and the second serving cell being the current serving cell.

Aspect 27: The method of any one of aspects 24 through 26, wherein identifying the selected system frame number for transmission parameter calculation input comprises: identifying that one of the first serving cell and the second serving cell is operating in Frequency Range 2 and has a smallest serving cell index of serving cells operating in Frequency Range 2; and identifying either the first system frame number or the second system frame number as the selected system frame number based at least in part on one of the first serving cell and the second serving cell having the smallest serving cell index of serving cells operating in Frequency Range 2.

Aspect 28: The method of aspect 27, wherein calculating the transmission parameter comprises: calculating a measurement gap for the serving cells operating in Frequency Range 2 based at least in part on the selected system frame number.

Aspect 29: The method of any one of aspects 27 or 28, wherein calculating the transmission parameter comprises: calculating a measurement gap for serving cells in a master cell group (MCG) and in a secondary cell group (SCG) based at least in part on the selected system frame number.

Aspect 30: The method of any one of aspects 24 through 29, wherein identifying the selected system frame number for transmission parameter calculation input comprises: identifying that one of the first serving cell and the second serving cell is operating in Frequency Range 2 and has a largest serving cell index of serving cells operating in Frequency Range 2; and identifying either the first system frame number or the second system frame number as the selected system frame number based at least in part on one of the first serving cell and the second serving cell having the largest serving cell index of serving cells operating in Frequency Range 2.

Aspect 31: The method of aspect 30, wherein calculating the transmission parameter comprises: calculating a measurement gap for the serving cells operating in Frequency Range 2 based at least in part on the selected system frame number.

Aspect 32: The method of any one of aspects 30 or 31, wherein calculating the transmission parameter comprises: calculating a measurement gap for serving cells in a master cell group (MCG) and a secondary cell group (SCG) based at least in part on the selected system frame number.

Aspect 33: The method of any one of aspects 24 through 32, wherein identifying the selected system frame number for transmission parameter calculation input comprises: identifying that the first serving cell and the second serving cell are part of a same cell group; identifying a primary cell within the same cell group; and identifying either the first system frame number or the second system frame number as the selected system frame number based at least in part on one of the first serving cell and the second serving cell being the primary cell.

Aspect 34: The method of aspect 33, wherein the primary cell of the same cell group is a primary cell (PCell) of a master cell group (MCG).

Aspect 35: The method of any one of aspects 33 or 34, wherein the primary cell of the same cell group is a primary secondary cell (PSCell) of a secondary cell group (SCG).

Aspect 36: The method of any one of aspects 24 through 35, wherein identifying the selected system frame number for transmission parameter calculation input comprises: transmitting an indication that one of the first serving cell or the second serving cell is associated with the selected system frame number; and identifying either the first system frame number or the second system frame number as the selected system frame number based at least in part on the transmitted indication.

Aspect 37: The method of aspect 36, wherein the indication comprises a cell index.

Aspect 38: The method of any one of aspects 36 or 37, wherein transmitting the indication comprises: transmitting the indication via a radio resource control message.

Aspect 39: The method of any one of aspects 24 through 38, wherein the transmission parameter comprises a hybrid automatic repeat request (HARQ) process identification for semi-persistent scheduling or configured grant operation.

Aspect 40: The method of any one of aspects 24 through 39, wherein the transmission parameter comprises a slot associated with a downlink assignment occurrence in semi-persistent scheduling operation.

Aspect 41: The method of any one of aspects 24 through 40, wherein the transmission parameter comprises one or more symbols associated with an uplink grant occurrence in configured grant operation.

Aspect 42: The method of any one of aspects 24 through 41, wherein the transmission parameter comprises a starting point for an on-duration in a discontinuous reception cycle.

Aspect 43: The method of any one of aspects 24 through 42, wherein the transmission parameter comprises a measurement gap timing for serving cell operation in Frequency Range 2.

Aspect 44: The method of any one of aspects 24 through 43, wherein the first serving cell is associated with a first radio access technology (RAT) and the second serving cell is associated with a second RAT.

Aspect 45: The method of aspect 44, wherein the first RAT is different from the second RAT.

Aspect 46: The method of any one of aspects 24 through 45, further comprising: identifying that the UE is further configured to communicate with one or more additional serving cells, wherein a second misalignment exists between the first system frame number, the second system frame number, and additional system frame numbers associated with the one or more additional serving cells; updating the selected system frame number based at least in part on the second misalignment, wherein the updated system frame number comprises the first system frame number, the second system frame number, or one of the additional system frame numbers; and calculating the transmission parameter based at least in part on the updated system frame number.

Aspect 47: An apparatus for wireless communications at a user equipment (UE) comprising at least one means for performing a method of any one of aspects 1 through 23.

Aspect 49: An apparatus for wireless communications at a user equipment (UE) comprising a processor; memory coupled with the processor; and instructions stored in the memory and executable by the processor to cause the apparatus to perform a method of any one of aspects 1 through 23.

Aspect 50: A non-transitory computer-readable medium storing code for wireless communications at a user equipment (UE) for wireless communications at a user equipment (UE) the code comprising instructions executable by a processor to perform a method of any one of aspects 1 through 23.

Aspect 51: An apparatus for wireless communications at a first serving cell comprising at least one means for performing a method of any one of aspects 24 through 46.

Aspect 53: An apparatus for wireless communications at a first serving cell comprising a processor; memory coupled with the processor; and instructions stored in the memory and executable by the processor to cause the apparatus to perform a method of any one of aspects 24 through 46.

Aspect 54: A non-transitory computer-readable medium storing code for wireless communications at a first serving cell for wireless communications at a first serving cell the code comprising instructions executable by a processor to perform a method of any one of aspects 24 through 46.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
identifying that the UE is configured to communicate with a first cell and with a second cell of a cell group via asynchronous carrier aggregation, wherein a misalignment exists between first frames of the first cell and second frames of the second cell and alignment exists between first slots within the first frames and second slots within the second frames in accordance with a first system frame number associated with the first cell being different from a second system frame number associated with the second cell;
calculating one or more of a hybrid automatic repeat request (HARQ) process identifier, a starting point of a discontinuous reception (DRX) offset of a DRX duration, an occurrence of a downlink assignment, or an occurrence of an uplink grant for both the first cell and the second cell of the cell group using the first system frame number in accordance with the first cell being a serving cell; and communicating with at least one of the first cell and the serving cell based at least in part on the calculation.

2. The method of claim 1, further comprising:
identifying that the first cell is the serving cell configured for at least one of semi-persistent scheduling communications or configured grant communications; and
selecting the first system frame number based at least in part on the first cell being the serving cell configured for the at least one of semi-persistent scheduling communications or the configured grant communications.

3. The method of claim 1, further comprising:
identifying that the first cell and the second cell are part of the cell group; and
selecting the first system frame number for the calculation for both the first cell and the second cell based at least in part on the first cell and the second cell being part of the cell group.

4. The method of claim 1, further comprising:
receiving an indication that the first cell is the serving cell.

5. The method of claim 4, wherein the indication comprises a cell index.

6. The method of claim 4, wherein receiving the indication comprises:
receiving the indication via a radio resource control message.

7. A method for wireless communications at a first cell, comprising:
determining a misalignment between first frames of the first cell and second frames of a second cell and an alignment between first slots within the first frames and second slots within the second frames in accordance with a first system frame number associated with the first cell being different from a second system frame number associated with the second cell, wherein the first cell and the second cell are in communication with a user equipment (UE) via asynchronous carrier aggregation and are part of a cell group;
calculating one or more of a hybrid automatic repeat request (HARQ) process identifier, a starting point of a discontinuous reception (DRX) offset of a DRX duration, an occurrence of a downlink assignment, or an occurrence of an uplink grant for both the first cell and the second cell of the cell group using the first system frame number in accordance with the first cell being a serving cell; and
communicating with the UE based at least in part on the calculation.

8. The method of claim 7, further comprising:
identifying that the first cell is the serving cell configured for at least one of semi-persistent scheduling communications or configured grant communications; and
identifying the first system frame number for use in the calculation based at least in part on the first cell being the serving cell configured for the at least one of semi-persistent scheduling communications or the configured grant communications.

9. The method of claim 7, further comprising:
identifying that the first cell and the second cell are part of the cell group; and
identifying the first system frame number for use in the calculation based at least in part on the first cell and the second cell being part of the cell group.

10. The method of claim 7, further comprising:
transmitting an indication that the first cell is the serving cell.

11. The method of claim 10, wherein the indication comprises a cell index.

12. The method of claim 10, wherein transmitting the indication comprises:
transmitting the indication via a radio resource control message.

13. A user equipment (UE) for wireless communications, comprising:
one or more memories storing processor-executable code; and
one or more processors coupled with the one or more memories and individually or collectively operable to execute the code to cause the UE to:
identify that the UE is configured to communicate with a first cell and with a second cell of a cell group via asynchronous carrier aggregation, wherein a misalignment exists between first frames of the first cell and second frames of the second cell and alignment exists between first slots within the first frames and second slots within the second frames in accordance with a first system frame number associated with the first cell being different from a second system frame number associated with the second cell;
calculate one or more of a hybrid automatic repeat request (HARQ) process identifier, a starting point of a discontinuous reception (DRX) offset of a DRX duration, an occurrence of a downlink assignment, or an occurrence of an uplink grant for both the first cell and the second cell of the cell group using the first system frame number in accordance with the first cell being a serving cell; and
communicate with at least one of the first cell and the serving cell based at least in part on the calculation.

14. The UE of claim 13, wherein the one or more processors are individually or collectively further operable to execute the code to cause the UE to:
identify that the first cell is the serving cell configured for at least one of semi-persistent scheduling communications or configured grant communications; and
select the first system frame number based at least in part on the first cell being the serving cell configured for the at least one of semi-persistent scheduling communications or the configured grant communications.

15. The UE of claim 13, wherein the one or more processors are individually or collectively further operable to execute the code to cause the UE to:
identify that the first cell and the second cell are part of the cell group; and
select the first system frame number for the calculation for both the first cell and the second cell based at least in part on the first cell and the second cell being part of the cell group.

16. The UE of claim 13, wherein the one or more processors are individually or collectively further operable to execute the code to cause the UE to:
receive an indication that the first cell is the serving cell.

17. The UE of claim 16, wherein the one or more processors are individually or collectively further operable to execute the code to cause the UE to:
receive the indication via a radio resource control message.

18. A first cell for wireless communications, comprising:

one or more memories storing processor-executable code; and one or more processors coupled with the one or more memories and individually or collectively operable to execute the code to cause the first cell to:

determine a misalignment between first frames of the first cell and second frames of a second cell and an alignment between first slots within the first frames and second slots within the second frames in accordance with a first system frame number associated with the first cell being different from a second system frame number associated with the second cell, wherein the first cell and the second cell are in communication with a user equipment (UE) via asynchronous carrier aggregation and are part of a cell group;

calculate one or more of a hybrid automatic repeat request (HARQ) process identifier, a starting point of a discontinuous reception (DRX) offset of a DRX duration, an occurrence of a downlink assignment, or an occurrence of an uplink grant for both the first cell and the second cell of the cell group using the first system frame number in accordance with the first cell being a serving cell; and communicate with the UE based at least in part on the calculation.

19. The first cell of claim 18, wherein the one or more processors are individually or collectively further operable to execute the code to cause the first cell to:

identify that the first cell is the serving cell configured for at least one of semi-persistent scheduling communications or configured grant communications; and identify the first system frame number for use in the calculation based at least in part on the first cell being the serving cell configured for the at least one of semi-persistent scheduling communications or the configured grant communications.

20. The first cell of claim 18, wherein the one or more processors are individually or collectively further operable to execute the code to cause the first cell to:

identify that the first cell and the second cell are part of the cell group; and identify the first system frame number for use in the calculation based at least in part on the first cell and the second cell being part of the cell group.

21. The first cell of claim 18, wherein the one or more processors are individually or collectively further operable to execute the code to cause the first cell to:

transmit an indication that the first cell is the serving cell.

22. The first cell of claim 21, wherein the one or more processors are individually or collectively further operable to execute the code to cause the first cell to:

transmit the indication via a radio resource control message.

* * * * *